(12) United States Patent
Matsumoto

(10) Patent No.: US 12,028,495 B2
(45) Date of Patent: Jul. 2, 2024

(54) IMAGE READING APPARATUS AND IMAGE FORMING APPARATUS

(71) Applicant: CANON KABUSHIKI KAISHA, Tokyo (JP)

(72) Inventor: Akira Matsumoto, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/464,650

(22) Filed: Sep. 11, 2023

(65) Prior Publication Data
US 2024/0098196 A1    Mar. 21, 2024

(30) Foreign Application Priority Data
Sep. 16, 2022 (JP) .................. 2022-147716

(51) Int. Cl.
*H04N 1/04* (2006.01)
*H04N 1/00* (2006.01)

(52) U.S. Cl.
CPC ....... *H04N 1/0057* (2013.01); *H04N 1/00554* (2013.01); *H04N 1/00557* (2013.01); *H04N 1/0083* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 4,754,337 A | 6/1988 | Nohtomi et al. | |
| 6,717,702 B1* | 4/2004 | Yamauchi | H04N 1/0083 358/497 |
| 7,324,781 B2 | 1/2008 | Nose et al. | |
| 2004/0223796 A1* | 11/2004 | Iwata | G03G 15/602 399/367 |
| 2005/0147438 A1* | 7/2005 | Nose | H04N 1/2032 399/367 |
| 2012/0250057 A1* | 10/2012 | Miyanagi | G03G 15/60 358/475 |
| 2014/0043663 A1* | 2/2014 | Matsumoto | H04N 1/1035 358/497 |
| 2017/0034373 A1* | 2/2017 | Shigeno | H04N 1/0083 |
| 2017/0094092 A1* | 3/2017 | Asano | H04N 1/0083 |
| 2022/0272219 A1* | 8/2022 | Nishida | G03G 15/60 |
| 2022/0417374 A1* | 12/2022 | Yamada | H04N 1/00559 |

FOREIGN PATENT DOCUMENTS

JP    2005194011 A    7/2005

* cited by examiner

*Primary Examiner* — Dung D Tran
(74) *Attorney, Agent, or Firm* — ROSSI, KIMMS & McDOWELL LLP

(57) ABSTRACT

An image reading apparatus includes a main body, a cover, a reading unit, a cable, and a shield member. The cover pivots with respect to the main body and move between a first closed position and a first open position. The reading unit pivots with respect to the main body and reads an image of a sheet conveyed in the conveyance path. The cable bridges between the main body and the reading unit and configured to transmit an image signal from the reading unit. The cable includes an exposed portion located between the main body and the reading unit and exposed to an outside of the main body and the reading unit when the cover is located in the first open position. The shield member has conductivity, grounded, and disposed to cover the exposed portion of the cable.

10 Claims, 24 Drawing Sheets

IMAGE READING APPARATUS AND IMAGE FORMING APPARATUS

BACKGROUND OF THE INVENTION

Field of the Invention

The present invention relates to an image reading apparatus which reads images from sheets, and an image forming apparatus to which the image reading apparatus is applied.

Description of the Related Art

Image reading apparatuses disposed in image forming apparatuses, such as copying machines and printers, and including an automatic document conveyance apparatus have been widespread. The automatic document conveyance apparatus serves as a sheet conveyance apparatus; and separates a document (hereinafter referred to also as a sheet), one by one, from other documents placed on a document tray and conveys the document. Japanese Patent Application Publication No. 2005-194011 discloses an image reading apparatus that is being developed and that includes a second reading unit in addition to a first reading unit disposed in a reader that includes a glass on which a document is placed. The second reading unit is disposed in the automatic document conveyance apparatus. This configuration enables the 1-pass duplex scanning, which is a function that can read image information of both sides of a document for duplex scanning, without reversing the document.

The image reading apparatus includes a main-body unit, a guide member, and a cover. The guide member can pivot (or rotate) with respect to the main-body unit, and includes the second reading unit. The cover covers the upper portion of the guide member. The cover forms an upper conveyance path between the cover and the guide member, and can open the upper conveyance path. The guide member forms a lower conveyance path, and can pivot with respect to the main-body unit in a state where the cover is opened. The lower conveyance path can be opened by pivoting the guide member.

By the way, there is a case where jam handling or cleaning work is performed in the vicinity of the second reading unit. The cleaning work is performed for removing dust stuck to a document feeding-reading glass. In this case, a worker can perform the intended work by opening the lower conveyance path, by opening the cover and pivoting the guide member.

In the above-described automatic document conveyance apparatus, a flexible flat cable (hereinafter referred to as an FFC) bridges a space between the main-body unit and the guide member. The FFC is a communication cable for sending image information that is read by the second reading unit.

However, in the automatic document conveyance apparatus described in Japanese Patent Application Publication No. 2005-194011, since the guide member, in which the second reading unit is disposed, pivots with respect to the main-body unit, a portion of the FFC may be exposed to the outside of the apparatus in a state where the cover is opened. The jam handling, the cleaning work for removing dust stuck to the document feeding-reading glass, and the like may be performed by any of an unspecified number of workers. Thus, if the portion of the FFC is exposed to the outside of the apparatus, static electricity may fly from fingertips of a worker to the FFC, possibly causing the failure of an electric component, such as the second reading unit.

An object of the present invention is to provide an image reading apparatus and an image forming apparatus that can reduce the possibility that the static electricity, which flies from fingertips of a worker during work performed in the vicinity of the FFC, causes the failure of an electric component connected to the FFC.

SUMMARY OF THE INVENTION

According to a first aspect of the present invention, an image reading apparatus includes a main body, a cover configured to pivot with respect to the main body and move between a first closed position and a first open position, the first closed position being a position in which the cover is configured to form a first area of a conveyance path in which a sheet is conveyed, the first open position being a position in which the cover is configured to open the first area, a reading unit configured to pivot with respect to the main body and read an image of a sheet conveyed in the conveyance path, a cable configured to transmit an image signal from the reading unit, the cable including an exposed portion located between the main body and the reading unit and exposed to an outside of the main body in a state where the cover is located in the first open position, and a shield member electrically grounded and disposed to cover the exposed portion of the cable.

According to a second aspect of the present invention, an image forming apparatus includes the image reading apparatus, and an image forming portion configured to form an image that has been read by the image reading apparatus on a sheet.

Further features of the present invention will become apparent from the following description of exemplary embodiments with reference to the attached drawings.

DESCRIPTION OF THE EMBODIMENTS

Figure 1:
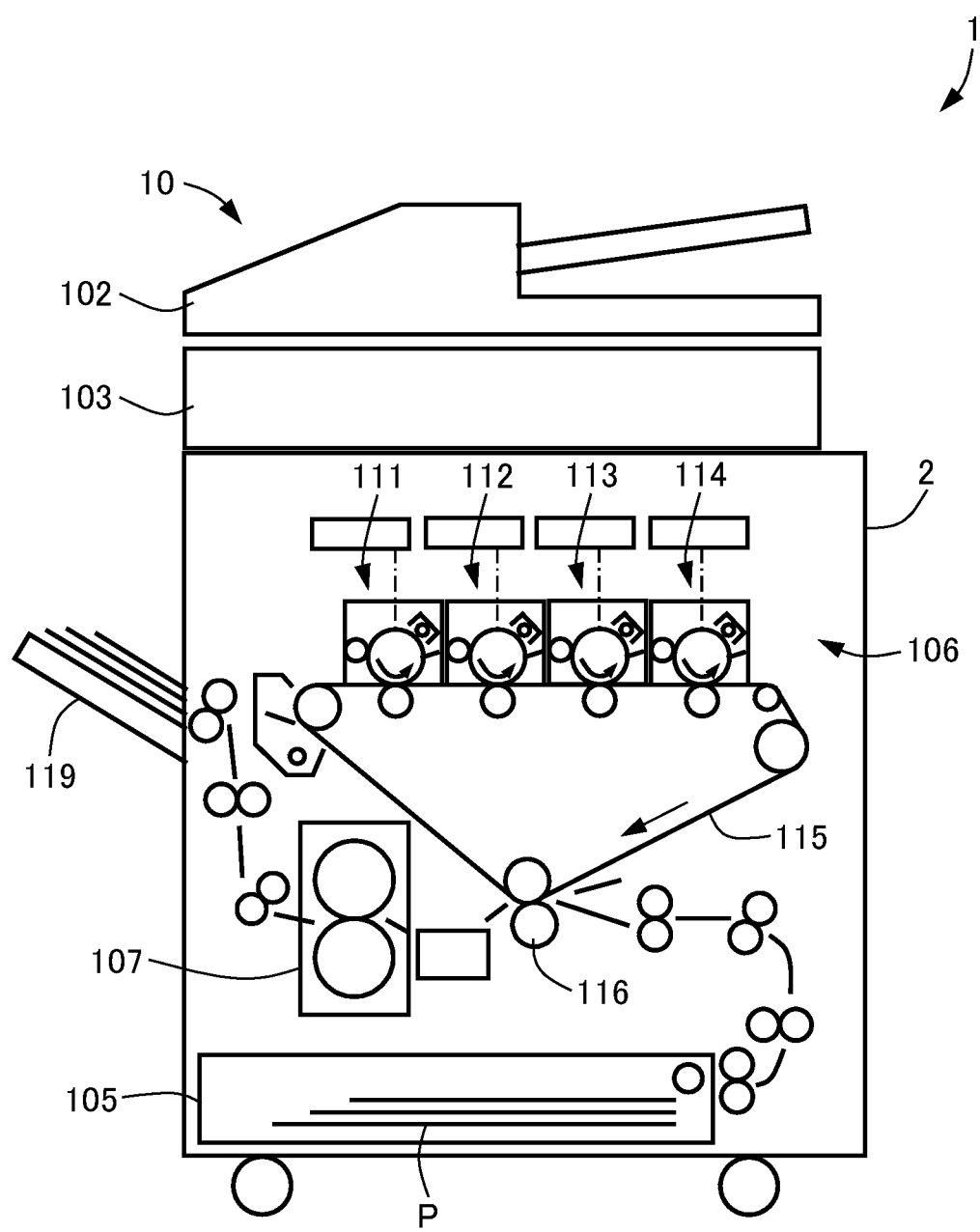
FIG. 1 is a schematic diagram illustrating an image forming apparatus of the present embodiment.

Hereinafter, the present embodiment will be described with reference to FIGS. 1 to 24. First, a schematic configuration of an image forming apparatus of the present embodiment will be described with reference to FIG. 1. FIG. 1 is a cross-sectional view illustrating an image forming apparatus 1 of the present embodiment. In the present embodiment, the image forming apparatus 1 is a full-color copying machine that includes a plurality of photosensitive drums. However, the image forming apparatus 1 is not limited to this. For example, the image forming apparatus 1 may be a monochrome or monocolor copying machine or printer that includes a single photosensitive drum, or may be an ink-jet printer.

Image Forming Apparatus

Next, the image forming apparatus 1 will be described with reference to FIG. 1. The image forming apparatus 1 has a configuration in which an image reading apparatus 10 is disposed above an image forming apparatus body 2. The image forming apparatus 1 conveys a sheet P conveyed from a sheet cassette 105, to an image forming portion 106; and forms a toner image on the sheet P Then the image forming apparatus 1 conveys the sheet P, on which the toner image has been formed in the image forming portion 106, to a fixing apparatus 107; and causes the fixing apparatus 107 to fix the toner image, still not fixed to the sheet P, to the sheet P by applying heat and pressure to the sheet P That is, the image forming portion 106 forms an image that has been read by the image reading apparatus 10, on the sheet. The sheet P may be a paper sheet such as a thin paper sheet or a thick paper sheet, a plastic film such as a sheet (OHP) used for overhead projectors, a paper sheet, such as a coated paper sheet, on which surface treatment has been performed, a specialized shape of sheet such as an envelope, or a cloth sheet.

The image forming portion 106 includes stations 111, 112, 113, and 114. The image forming apparatus 1 also includes an intermediate transfer belt 115 and a secondary transfer outer roller 116. The stations 111, 112, 113, and 114 respectively form toner images of yellow, magenta, cyan, and black on the intermediate transfer belt 115. The configurations of the stations 111, 112, 113, and 114 are the same as each other, except that the colors of toner are different from each other. The toner images formed by the stations 111, 112, 113, and 114 are transferred onto the intermediate transfer belt 115. The secondary transfer outer roller 116 transfers the toner image formed on the intermediate transfer belt 115, onto the sheet P conveyed from the sheet cassette 105. The fixing apparatus 107 fixes the toner image transferred onto the sheet P, to the sheet P by applying heat and pressure to sheet P The sheet P to which the toner image has been fixed is discharged to a discharging tray 119.

Image Reading Apparatus

Figure 2:
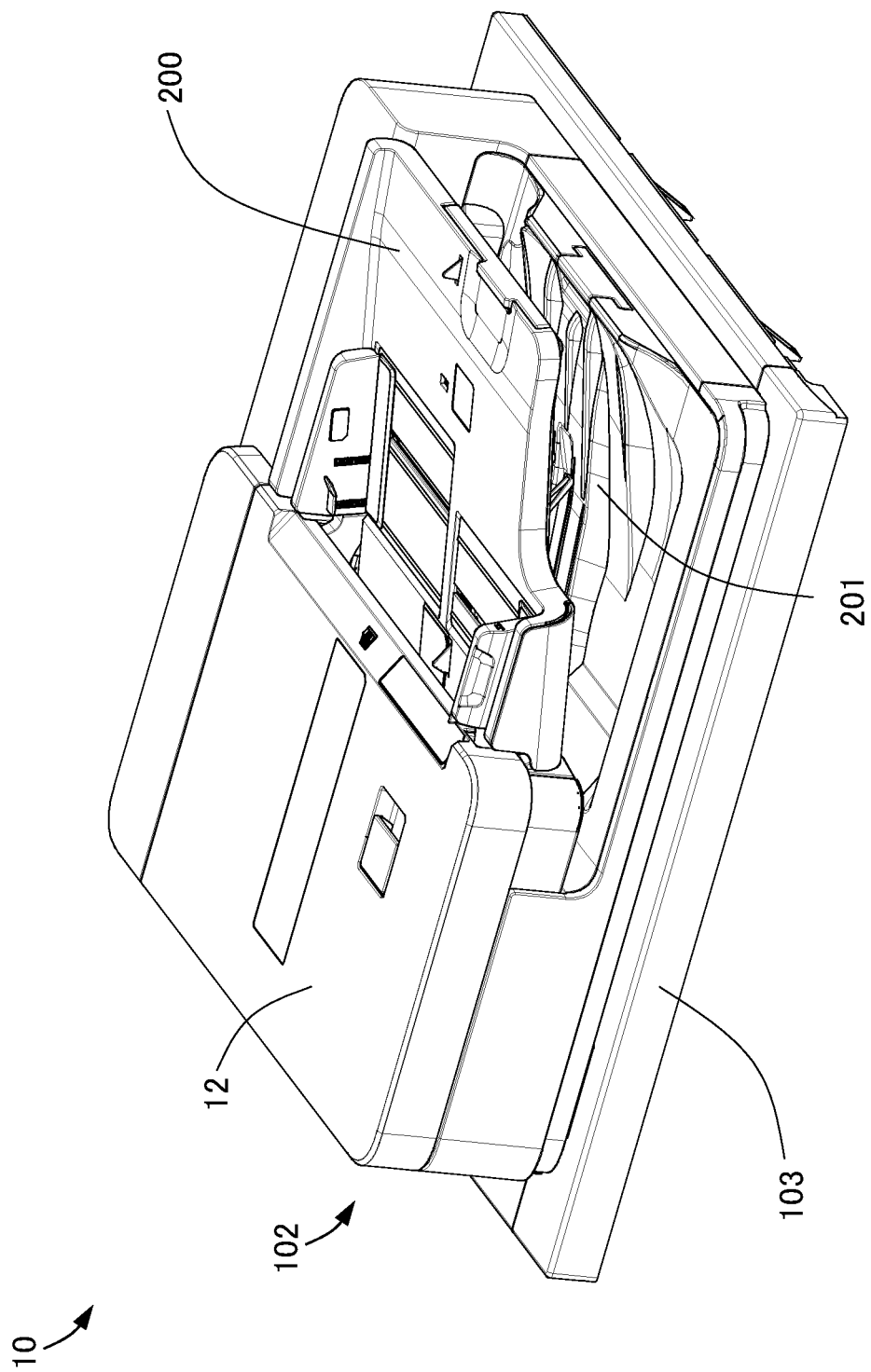
FIG. 2 is a perspective view illustrating an image reading apparatus of the present embodiment.
Figure 3:
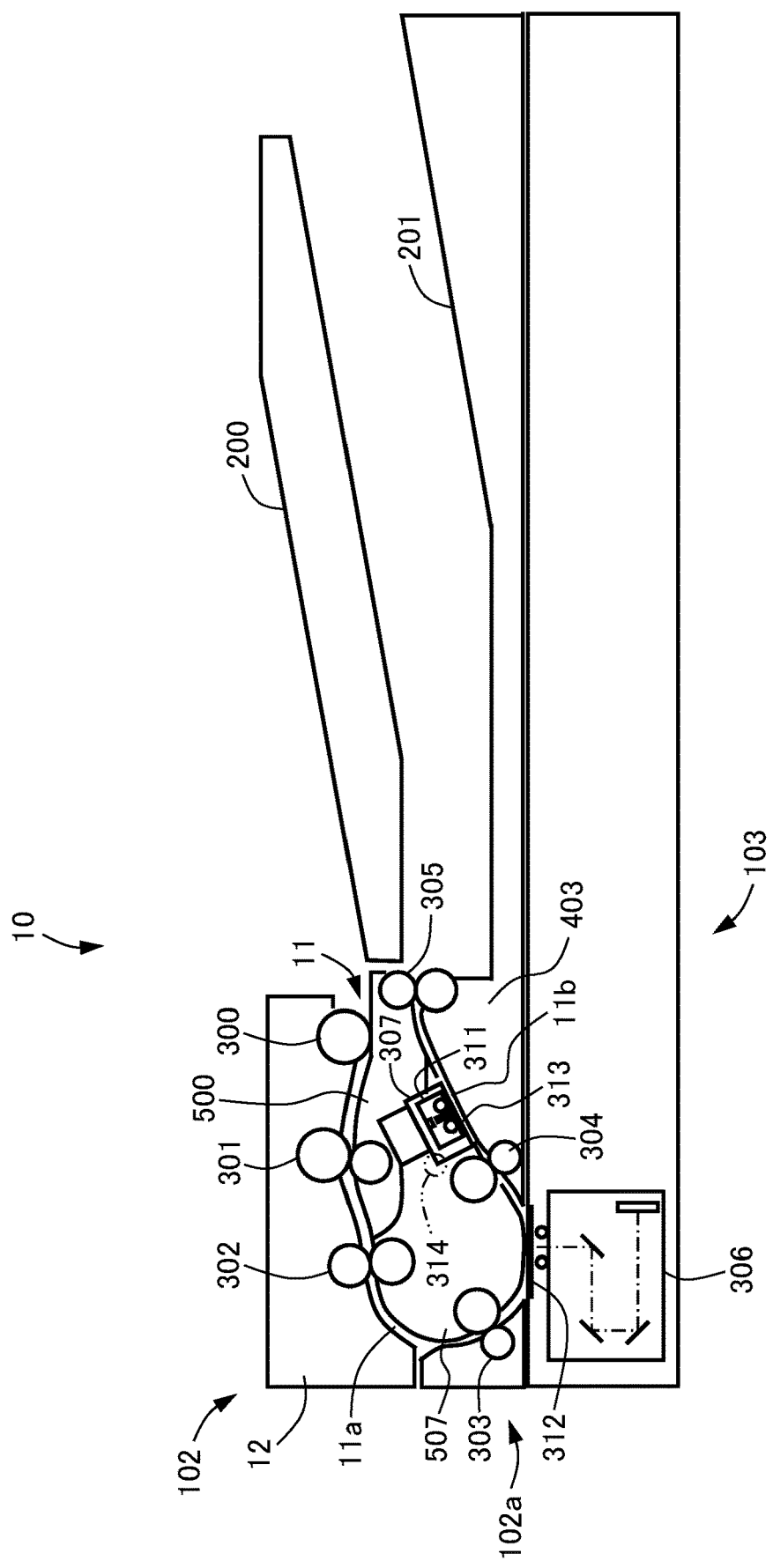
FIG. 3 is a cross-sectional view illustrating the image reading apparatus of the present embodiment.

FIG. 2 is a perspective view illustrating the image reading apparatus 10. As illustrated in FIG. 2, the image reading apparatus 10 includes a reader 103 and an auto document feeder (ADF) 102, which are disposed above the image forming apparatus body 2. The reader 103 reads the image of a document that is set by a user. FIG. 3 is a cross-sectional view illustrating the image reading apparatus 10. As illustrated in FIG. 3, the ADF 102 conveys a plurality of documents that is set on a document tray 200, into the interior of the image reading apparatus 10, so that a first reading unit 306 and a second reading unit 307, which are disposed in the image reading apparatus 10, can read the image of the document. Specifically, a document placed on the document tray 200 is conveyed in a conveyance path 11, by a feeding roller 300, a conveyance roller 301, a conveyance roller 302, and a conveyance roller 303. The image information of a first side of the document is read, via a first document-feeding-reading glass 312, by the first reading unit 306 disposed in the reader 103. The document is further conveyed by a conveyance roller 304, and the image information of a second side (opposite to the first side) of the document is read, via a second document-feeding-reading glass 313, by the second reading unit 307 disposed in the ADF 102. After the image of the document is read, the document is discharged to a discharging tray 201 by a discharging roller 305. In addition, a document can be placed on a document platen glass by opening and closing the ADF 102. In this case, the reader 103 can read the image of the document by moving the first reading unit 306 and causing the first reading unit 306 to scan the document.

In the present embodiment, the ADF 102 includes a main-body unit 102a that is one example of a main body, an outer cover 12 that is one example of a cover, a separation guide member 500, and the second reading unit 307 that is one example of a reading unit. The main-body unit 102a is a casing that includes a conveyance guide member 507, a reading-guide member 403, and a frame such as a below-described front side-plate 1900. In the main-body unit 102a, the conveyance path 11 is formed. As illustrated in FIG. 2, the outer cover 12 forms a top face of the ADF 102. The outer cover 12 is disposed so as to be able to pivot with respect to the main-body unit 102a, and can move between a first closed position in which the outer cover 12 is closed and a first open position in which the outer cover 12 is opened. The first closed position is a position in which the cover 12 is configured to form an upper conveyance path 11a of a conveyance path 11 in which a sheet is conveyed. The first open position is a position in which the cover 12 is configured to open the upper conveyance path 11a. In the first closed position, the outer cover 12, together with the separation guide member 500, forms the upper conveyance path 11*a* of the conveyance path 11. The upper conveyance path 11*a* is one example of a first area of the conveyance path 11. In the first open position, the outer cover 12 opens the upper conveyance path 11*a*. In the present embodiment, in the first closed position, the outer cover 12 forms the upper conveyance path 11*a* between the outer cover 12 and both the conveyance guide member 507 and the separation guide member 500. The bottom face of the outer cover 12 faces the upper surface of a document that is being conveyed, and the top face of the separation guide member 500 faces the lower surface of a document that is being conveyed. The reading-guide member 403 is disposed opposite to the separation guide member 500 with respect to the second reading unit 307, and forms a lower conveyance path 11*b* between the reading-guide member 403 and the second reading unit 307. The lower conveyance path 11*b* is a portion of the conveyance path 11, and is continuous with the upper conveyance path 11*a* and positioned downstream of the upper conveyance path 11*a* in the sheet conveyance direction. The second reading unit 307 is disposed between the upper conveyance path 11*a* and the lower conveyance path 11*b* in the vertical direction. The upper conveyance path 11*a* and the lower conveyance path 11*b* constitute the conveyance path 11, which is curved and substantially U-shaped.

Second Reading Unit

Figure 4:
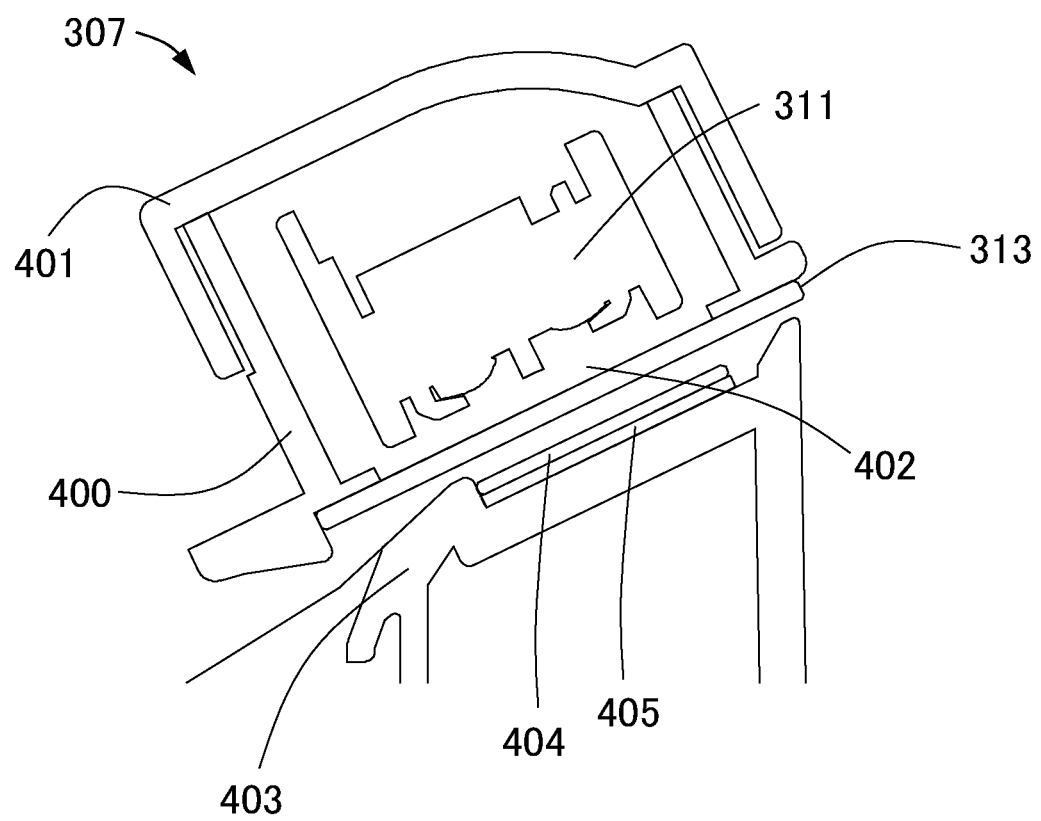
FIG. 4 is a cross-sectional view of a second reading unit of the present embodiment.

FIG. 4 is a cross-sectional view of the second reading unit 307. As illustrated in FIG. 4, the second reading unit 307 includes a first casing member 400, a second casing member 401, a CIS 311 that is a contact image sensor, and the second document-feeding-reading glass 313. The second reading unit 307 moves relative to the conveyance guide member 507 (see FIGS. 5 to 8), which is disposed in the main-body unit 102*a*, by pivoting and linearly moving with respect to the conveyance guide member 507. Note that although the second reading unit 307 pivots and linearly moves with respect to the conveyance guide member 507 in the present embodiment, the present disclosure is not limited to this. For example, the second reading unit 307 may simply pivot with respect to the conveyance guide member 507, may simply move linearly with respect to the conveyance guide member 507, or may perform other relative movement with respect to the conveyance guide member 507. The CIS 311 is accommodated by the first casing member 400 and the second casing member 401. The CIS 311 is one example of a reading sensor, and is connected to a below-described FFC 9. The CIS 311 reads an image of a sheet conveyed in the lower conveyance path 11*b* of the conveyance path 11.

The first casing member 400 and the second casing member 401 are one example of a casing member. A portion of the first casing member 400 on the conveyance path side is provided with an opening portion 402 for reading the image information of a sheet conveyed, and the second document-feeding-reading glass 313 is stuck on the first casing member 400 so as to cover the opening portion 402. The reading-guide member 403 that serves as a conveyance guide member is disposed on the outer side of the second document-feeding-reading glass 313, that is, on the conveyance path side of the second document-feeding-reading glass 313. The reading-guide member 403 is provided with a white sheet 405 and a protective glass 404, disposed so as to face the CIS 311. The protective glass 404 protects the white sheet 405. The white sheet 405 is disposed for performing the shading compensation of the CIS 311 before the image information of a document is read. The protective glass 404 is disposed so that the surface of the white sheet 405 is not damaged (e.g., scratched) by a document conveyed.

Figure 5:
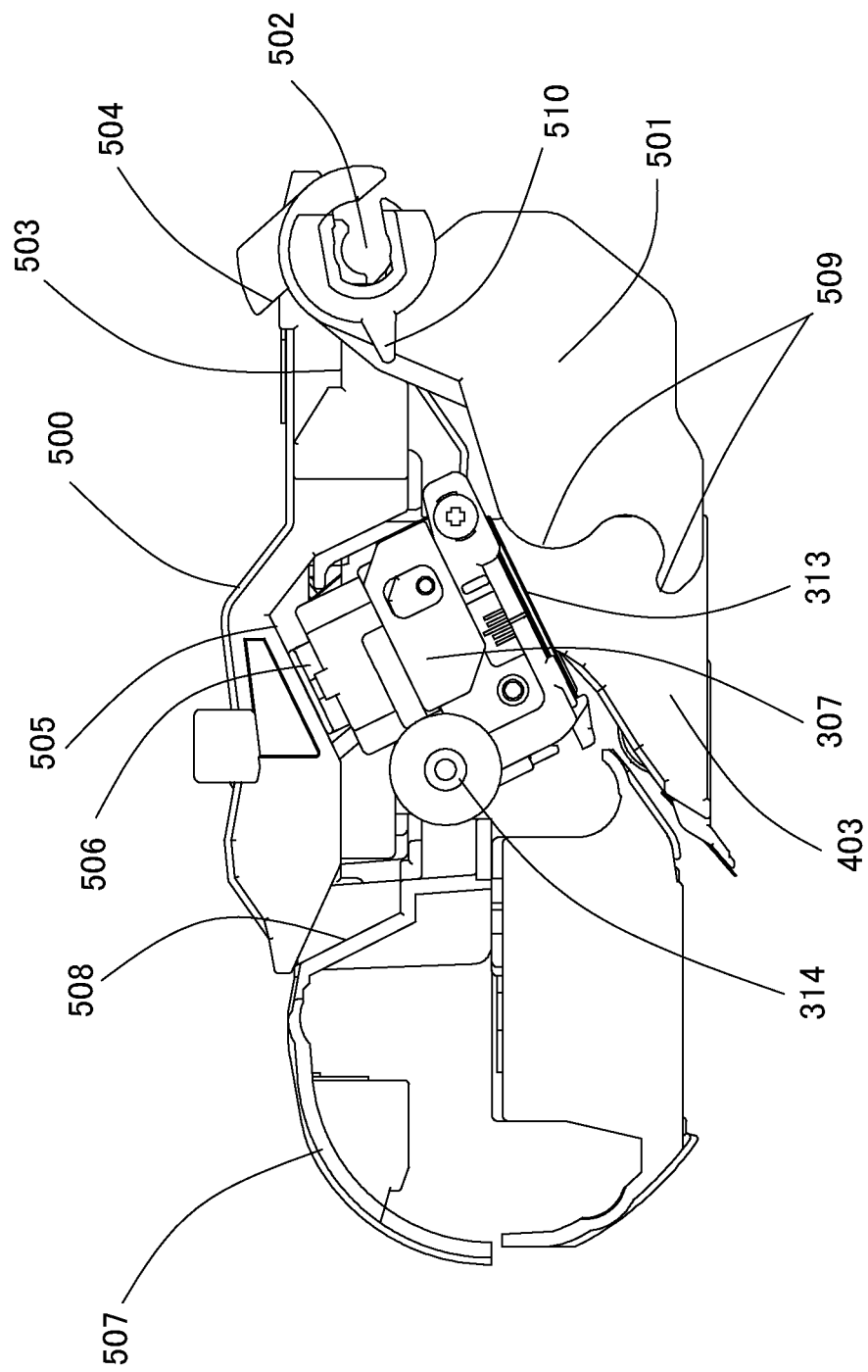
FIG. 5 is a front view illustrating a state where the second reading unit and a separation guide member of the present embodiment are located in closed positions.

Next, how the second reading unit 307 pivots in the ADF 102 of the present embodiment will be described with reference to FIGS. 5 to 8. FIGS. 5 to 8 are front views illustrating a configuration for pivoting the second reading unit 307 of the present embodiment. As illustrated in FIG. 5, in the ADF 102, the separation guide member 500, the conveyance guide member 507, and the reading-guide member 403 constitute a conveyance guide. The separation guide member 500 is one example of a pivot guide member, and constitutes half the conveyance guide on the feeding and separation portion side. That is, the separation guide member 500 is disposed closer to the upper conveyance path 11*a* than the second reading unit 307 is. The separation guide member 500 is disposed so as to be able to pivot on a pivot shaft 502 with respect to the main-body unit 102*a*. The separation guide member 500 can move between a second closed position (FIG. 5) in which the separation guide member 500 is closed and a second open position (FIG. 8) in which the separation guide member 500 is opened. The second closed position is a position in which the separation guide member 500 is configured to cover the second reading unit 307 and the exposed portion 90. The second open position is a position in which the separation guide member 500 is configured to expose the second reading unit 307 and the exposed portion 90. In the second closed position, the separation guide member 500 covers the second reading unit 307 and a below-described exposed portion 90; in the second open position, the separation guide member 500 opens the second reading unit 307 and the exposed portion 90. In addition, the second reading unit 307 is disposed so as to be able to pivot on a pivot shaft 314 with respect to the main-body unit 102*a*. The second reading unit 307 can pivot between a reading position in which the second document-feeding-reading glass 313 faces the reading-guide member 403 and an exposing position in which the second reading unit 307 opens the lower conveyance path 11*b*. The reading position is a position in which the second reading unit 307 is located for reading the image of a document. The exposing position is a position in which the second reading unit 307 is located when the second document-feeding-reading glass 313 is exposed to the outside of the apparatus when viewed from above. Note that as illustrated in FIG. 3, when the outer cover 12 is located in the first closed position, the outer cover 12 covers the upper portion of the separation guide member 500. Thus, if the outer cover 12 is opened until the outer cover 12 is located in the first open position, it becomes possible to pivot the separation guide member 500.

The conveyance guide member 507 guides a document in a position positioned downstream of the separation guide member 500 in the document conveyance direction, and constitutes half the conveyance guide that is bent. The reading-guide member 403 constitutes a conveyance guide that the second reading unit 307 faces. The separation guide member 500 is provided with the pivot shaft 502, and can be pivoted by a user for performing the jam handling and for cleaning the second document-feeding-reading glass 313 disposed on the second reading unit 307 and the protective glass 404 disposed for the white sheet 405. Note that in the present embodiment, members necessary for describing the configuration of the present invention are mainly described schematically.

Next, a state where the second reading unit 307 and the separation guide member 500 are located in closed positions, as illustrated in FIG. 5, will be described. In this state, a pressing portion 505 formed in the separation guide member 500 pushes down a pressed portion 506 formed in the second reading unit 307, downward from above. Thus, the second document-feeding-reading glass 313 of the second reading unit 307 abuts against the reading-guide member 403 that faces the second document-feeding-reading glass 313, with a predetermined clearance being formed, so that the conveyance path is formed. Furthermore, a cam member 501 that serves as an interlocking member is disposed on the pivot shaft 502 of the separation guide member 500. In addition, the separation guide member 500 is provided with a first contact portion 503, and the cam member 501 is provided with a second contact portion 504.

Figure 6:
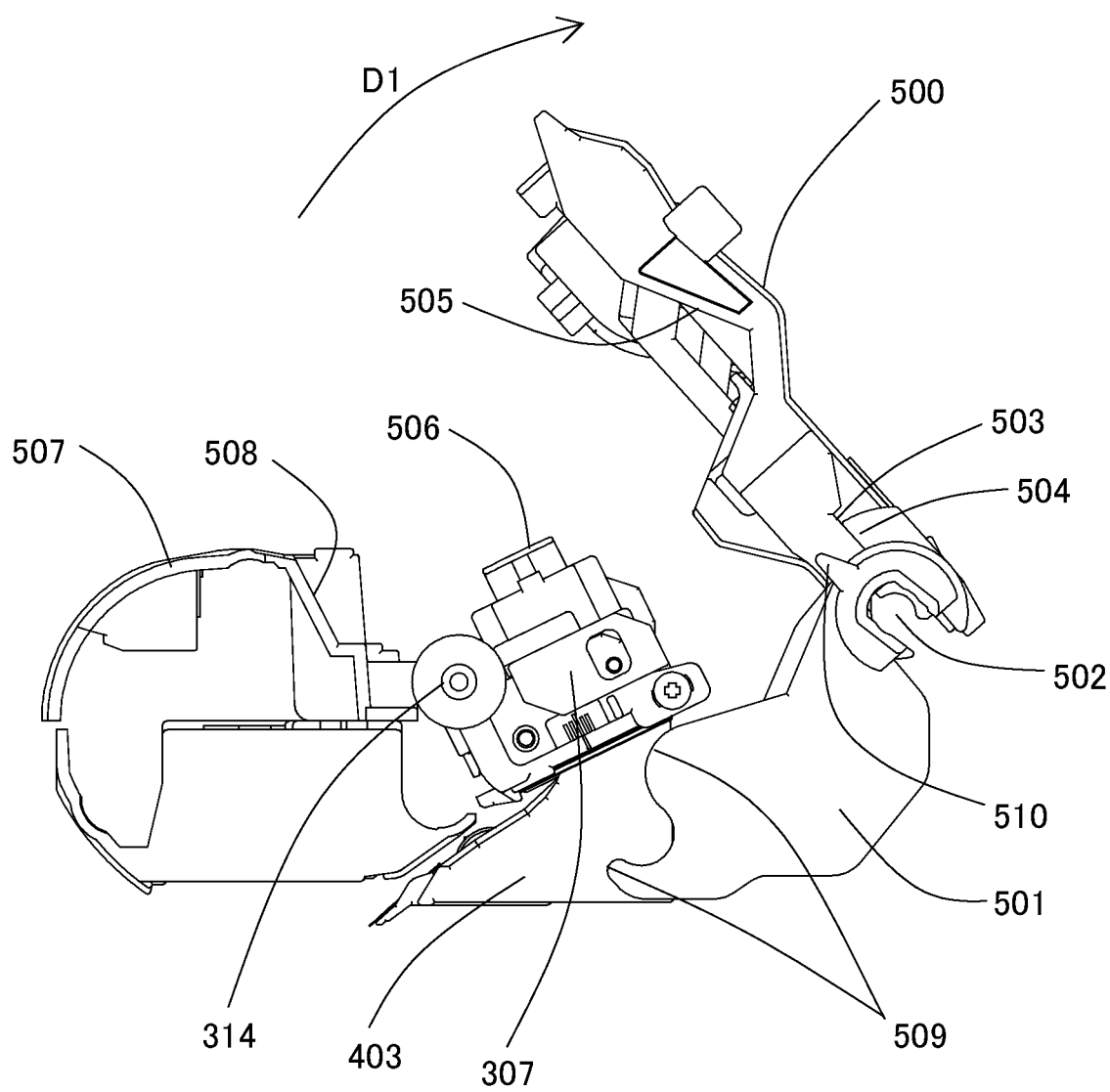
FIG. 6 is a front view illustrating a state where the separation guide member of the present embodiment has been pivoted.

FIG. 6 is a front view illustrating a state where the separation guide member 500 has been pivoted in a D1 direction. If the separation guide member 500 is pivoted by a predetermined angle or more, the cam member 501 also pivots in synchronization with the separation guide member 500 (see FIGS. 6 to 8). Furthermore, the separation guide member 500 is provided with a first projection portion 510. Thus, if the separation guide member 500 is pivoted by a predetermined angle or more, the first projection portion 510 abuts against a below-described second projection portion 1901, so that the pivoted state is kept.

Figure 7:
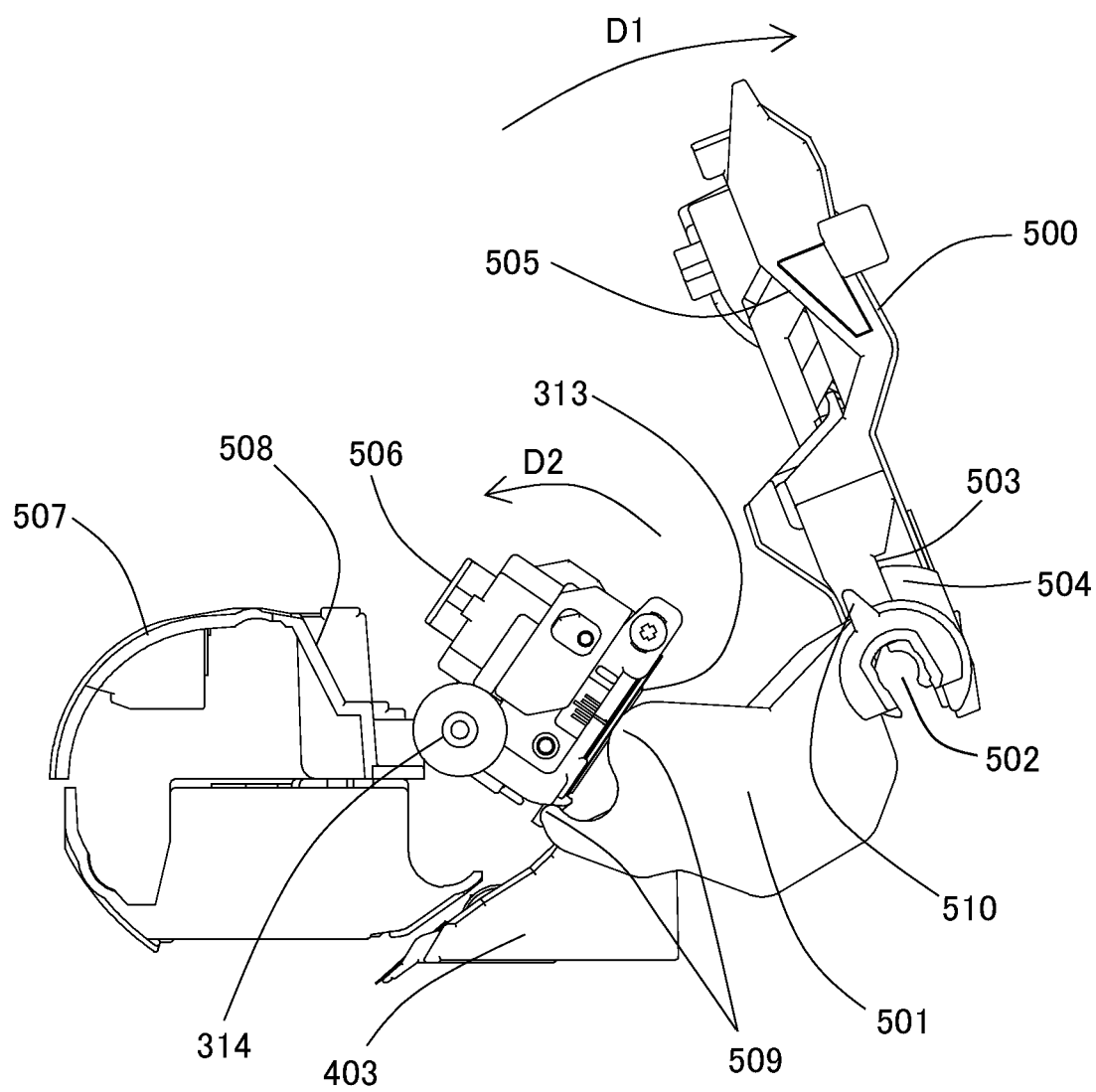
FIG. 7 is a front view illustrating a state where the separation guide member of the present embodiment is pushing up the second reading unit.

On the other hand, the second reading unit 307 is provided with the pivot shaft 314. FIG. 7 is a front view illustrating a state where the separation guide member 500 is pushing up the second reading unit 307 in a D2 direction via the cam member 501. As illustrated in FIG. 7, if the separation guide member 500 is pivoted by a predetermined angle or more, a cam portion 509 of the cam member 501, which pivots in synchronization with the separation guide member 500, abuts against the second reading unit 307. Thus, the second reading unit 307 starts to pivot on the pivot shaft 314 in the D2 direction, in synchronization with the pivot motion of the separation guide member 500.

Figure 8:
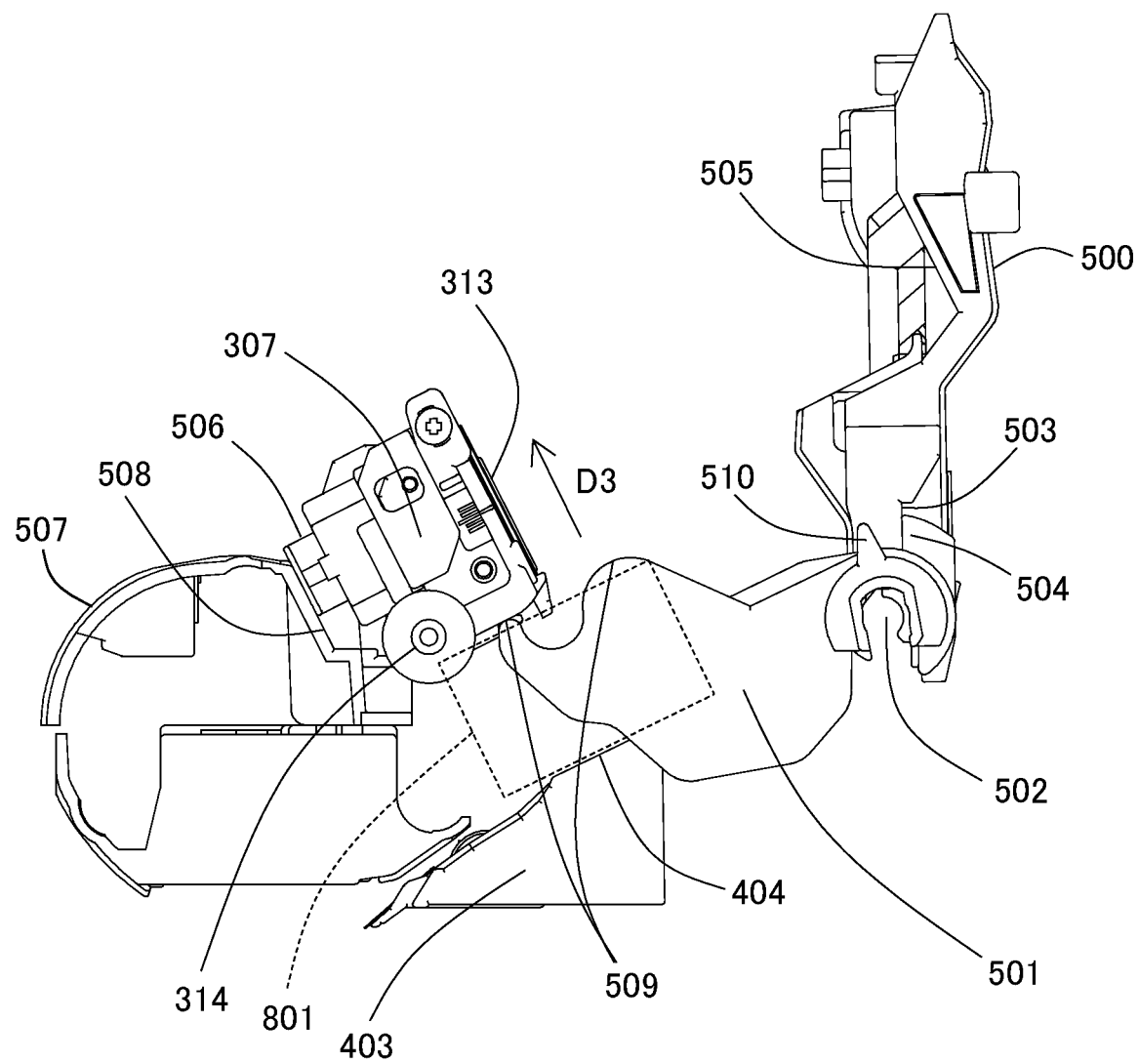
FIG. 8 is a front view illustrating a state where the second reading unit and the separation guide member of the present embodiment are located in open positions.

FIG. 8 is a front view illustrating a state where the second reading unit 307 and the separation guide member 500 are located in open positions. As illustrated in FIG. 8, if the second reading unit 307 is pivoted by a predetermined angle, the pressed portion 506 formed in the second reading unit 307 abuts against an angle regulation portion 508 formed in the conveyance guide member 507, so that the second reading unit 307 is prevented from pivoting. In addition, the second reading unit 307 that is prevented from pivoting is caused to slide in a D3 direction, by the cam member 501. In the state illustrated in FIG. 8, the pivoted state of the separation guide member 500 is finally kept by the second projection portion 1901, which is a pivot regulation portion, and the pivoted state of the second reading unit 307 is also kept by the separation guide member 500 whose pivoted state is kept.

When documents are being conveyed, a user was not able to access the second document-feeding-reading glass 313 and the protective glass 404 of the white sheet 405, as illustrated in FIG. 5. In the present embodiment, however, as illustrated in FIG. 8, a user can access both the second document-feeding-reading glass 313 and the protective glass 404 of the white sheet 405 by pivoting the second reading unit 307 and the separation guide member 500. In particular, since the second reading unit 307 slides, as illustrated in FIG. 8, in the D3 direction in the latter half of the pivot motion, it becomes possible to secure a cleaning space 801 for cleaning the protective glass 404 of the white sheet 405.

FFC

Figure 9:
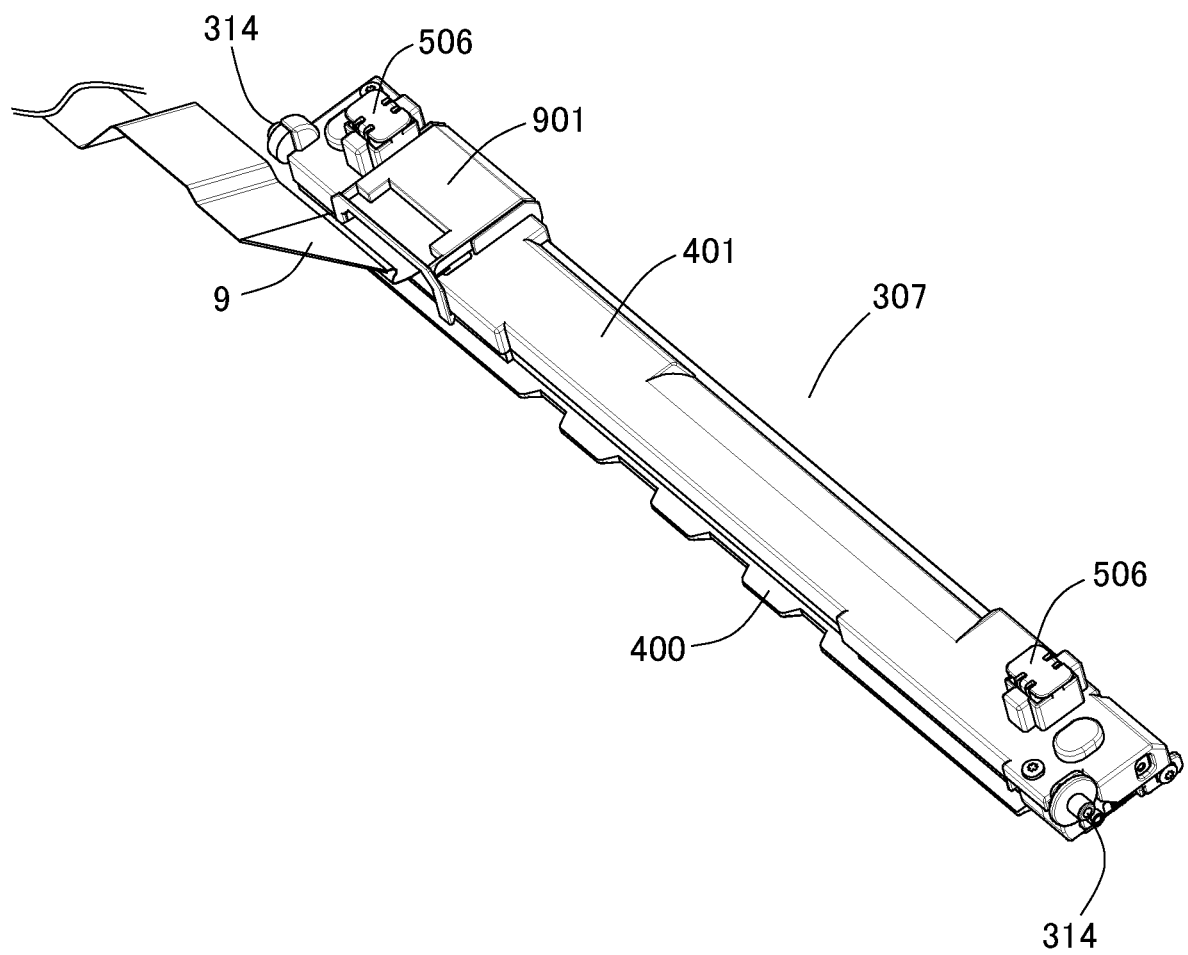
FIG. 9 is a perspective view illustrating the second reading unit and an FFC of the present embodiment.
Figure 10:
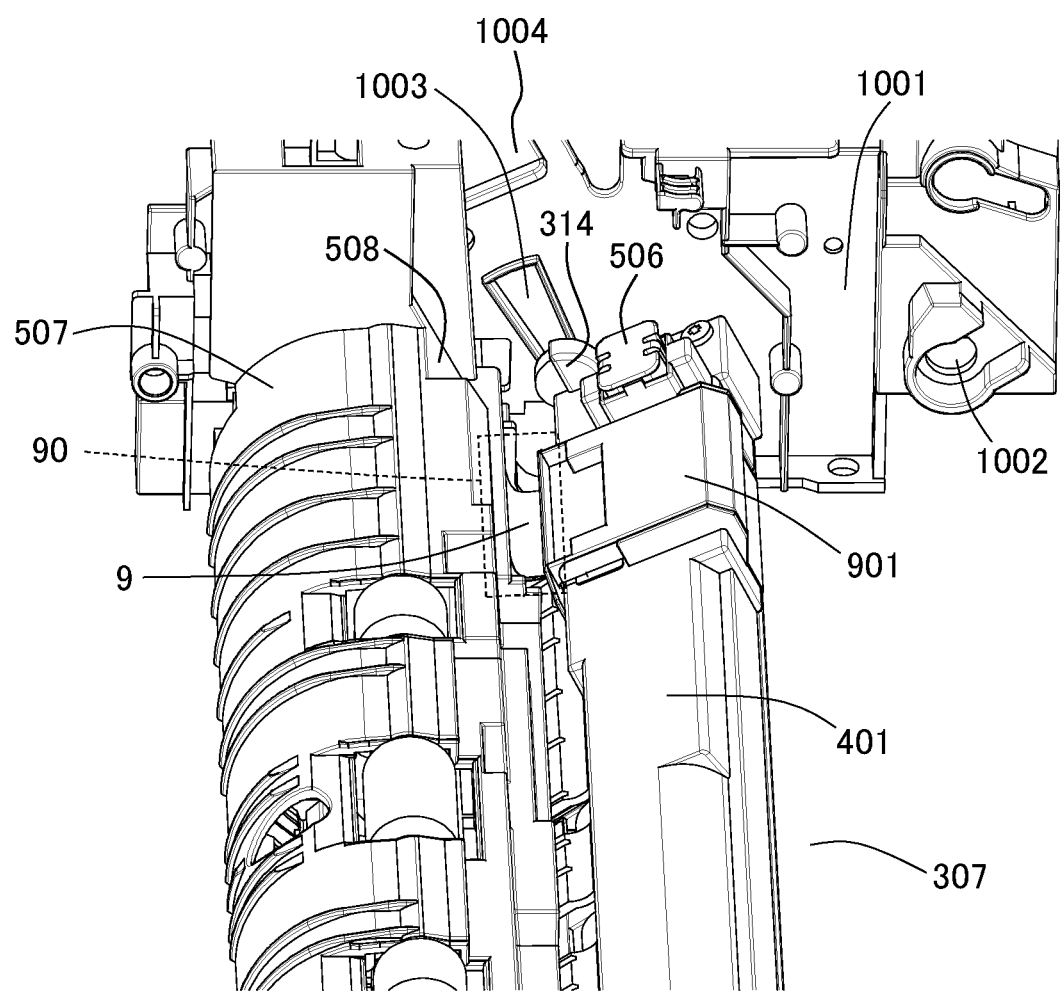
FIG. 10 is a perspective view illustrating a position of an exposed portion, positioned in an ADF of the present embodiment.
Figure 11:
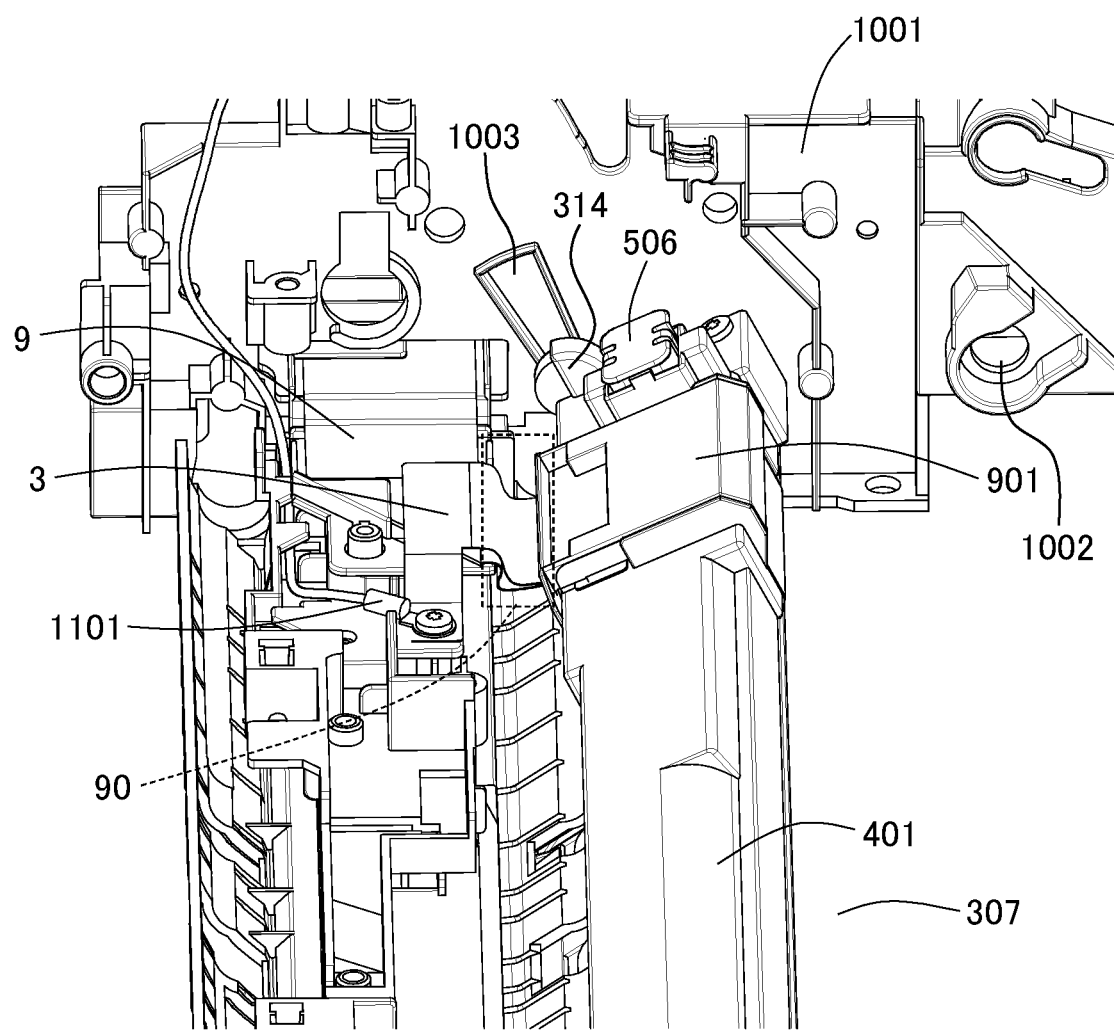
FIG. 11 is a perspective view illustrating arrangement of an FFC earth sheet, positioned in the ADF of the present embodiment.
Figure 12:
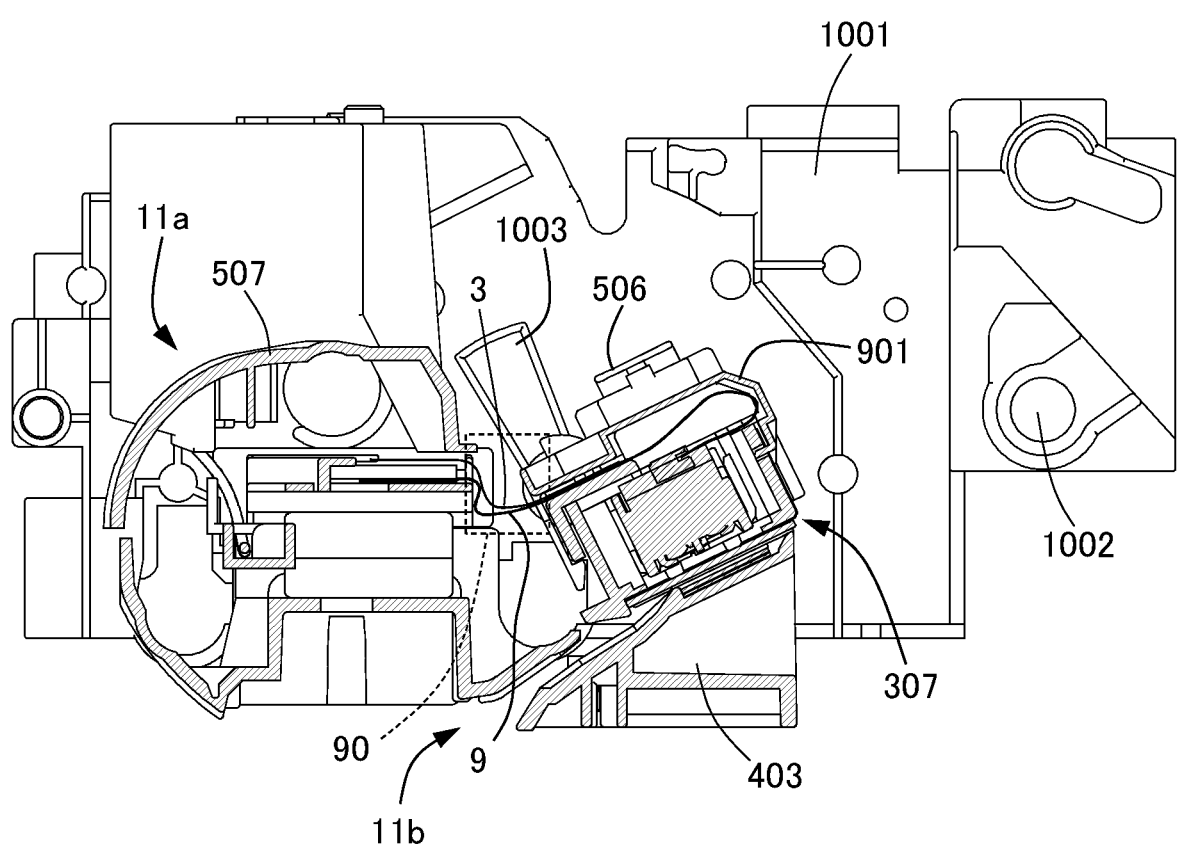
FIG. 12 is a cross-sectional view illustrating the arrangement of the FFC earth sheet of the present embodiment.

Next, a configuration of the FFC 9, which is connected to the second reading unit 307, will be described with reference to FIGS. 9 to 13. FIG. 9 is a perspective view illustrating a positional relationship between the second reading unit 307 and the FFC 9. FIGS. 10 to 12 are diagrams illustrating the position of the exposed portion 90 of the FFC 9, and the arrangement of an FFC earth sheet 3 that serves as a conductive sheet member.

As illustrated in FIG. 9, the FFC 9, which is one example of a flexible cable, is connected to the CIS 311 disposed in the second reading unit 307; and an FFC cover member 901 covers the connection portion of the FFC 9 so as to conceal the connection portion. As illustrated in FIG. 10, since the second reading unit 307 is configured so as to be able to pivot in the ADF 102, a portion of the FFC 9, which serves as the exposed portion 90, is exposed to the outside of the apparatus, when viewed from above, in a state where both the outer cover 12 and the separation guide member 500 are opened. That is, the exposed portion 90 of the FFC 9 bridges a space between the conveyance guide member 507 and the second reading unit 307, and the FFC 9 transmits an electric signal (i.e., an image signal). The exposed portion 90 is one example of a bridging portion. The exposed portion 90 is located between the main-body unit 102a and the second reading unit 307, and exposes to an outside of the main-body unit 102a and the second reading unit 307. However, if the portion of the FFC 9 is exposed to the outside of the apparatus, the static electricity may fly from fingertips of a user to the exposed portion of the FFC 9 when the user performs work, and may cause the failure of an electric component. Note that the exposed portion 90 is a portion of the FFC 9 that is exposed to the outside in the clearance between the conveyance guide member 507 fixed to the main-body unit 102a and the second reading unit 307, in a state where the outer cover 12 is located in the first open position and the separation guide member 500 is located in the second open position.

In the present embodiment, as illustrated in FIG. 11, the FFC earth sheet 3 that is a conductive sheet member is disposed so as to cover the exposed portion 90 from above. That is, the FFC earth sheet 3 covers a surface of the portion of the FFC 9 that is exposed to a user side. In addition, one end of the FFC earth sheet 3 is electrically grounded, via an earth wire 1101. That is, the FFC earth sheet 3 is one example of a shield member that has conductivity, and that is grounded. The FFC earth sheet 3 is disposed closer to the upper conveyance path 11a than the exposed portion 90 is. The FFC earth sheet 3 has conductivity and is grounded, so that the FFC earth sheet 3 discharges the static electricity, which is applied from the outside to the exposed portion 90, to the ground. The width of the FFC earth sheet 3 is substantially equal to the width of the FFC 9. However, the present disclosure is not limited to this. That is, the width of the FFC earth sheet 3 may be larger or smaller than the width of the FFC 9.

FIG. 12 is a cross-sectional view of the ADF 102 viewed from the front side of the ADF 102, and illustrates the arrangement of the FFC earth sheet 3. In the present embodiment, since a user accesses the components from above, the FFC earth sheet 3 is disposed so as to cover the upper side of the exposed portion 90 of the FFC 9.

Since the second reading unit 307 pivots as illustrated in FIGS. 5 to 8, the exposed portion 90 of the FFC 9 and a portion of the FFC earth sheet 3 that corresponds to the exposed portion 90 will be both bent an expected number of times of pivot motion of the second reading unit 307. Thus, it is necessary that the FFC earth sheet 3 be made of a material that can endure the expected number of bendings. In the present embodiment, the FFC earth sheet 3 is made of a metal-foil composite film. The metal-foil composite film is a composite material in which an aluminum foil is laminated on a PET base material made of polyester film. That is, the FFC earth sheet 3 is a film in which a metal layer and a polyester layer are laminated on each other.

Preferably, the FFC earth sheet 3 is disposed such that the aluminum-foil surface faces a direction from which the static electricity flies to the FFC 9, and that the PET base material faces the FFC 9. Specifically, in the present embodiment, the aluminum-foil surface is disposed above the FFC 9 in FIG. 12. That is, in the present embodiment, the FFC earth sheet 3 is disposed such that the polyester layer is closer to the FFC 9 than the metal layer is. With this arrangement, the FFC earth sheet 3 shields the FFC 9 against the static electricity while making the durability against bending higher than that of an FFC earth sheet 3 that is a simple aluminum sheet.

Figure 13:
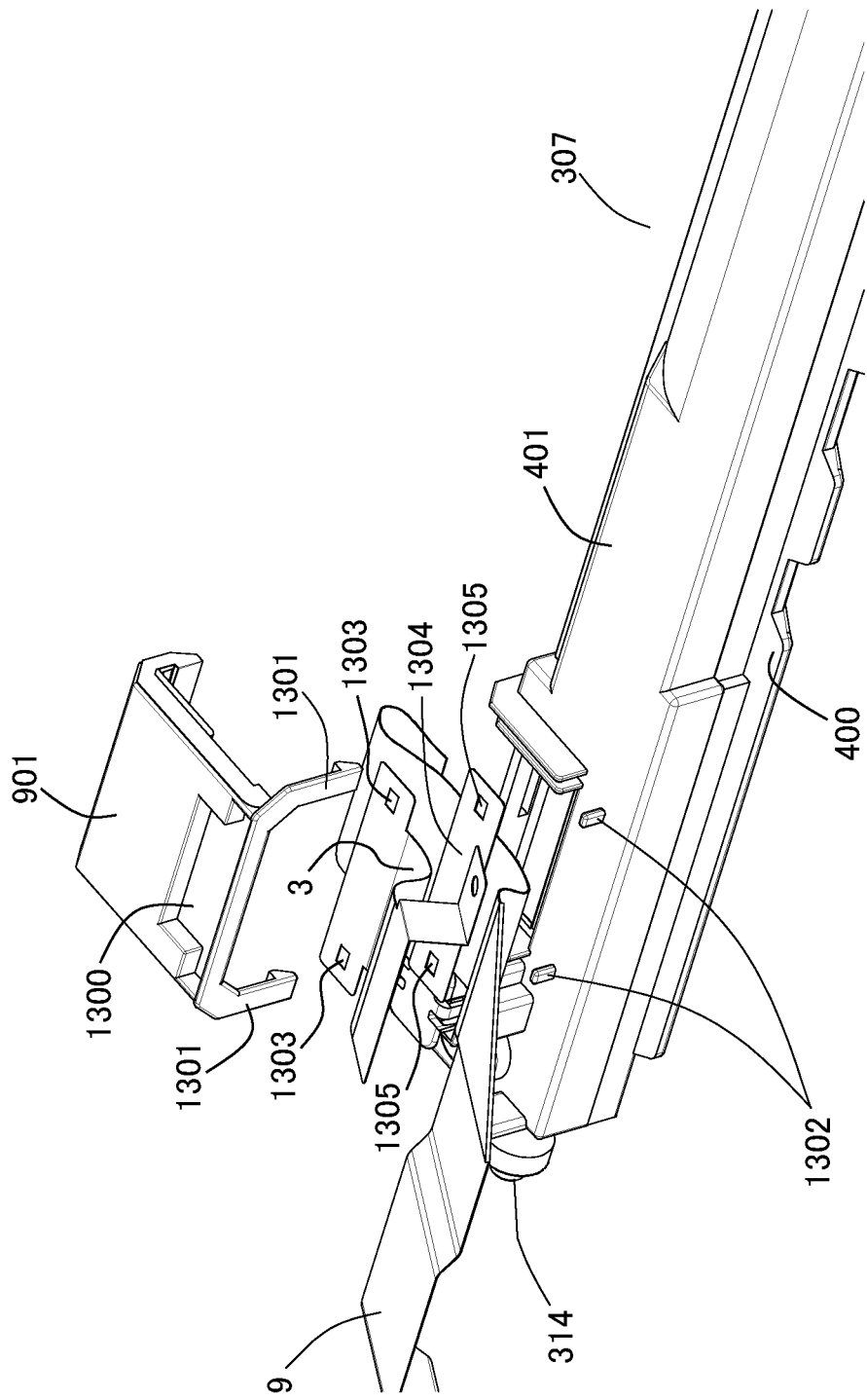
FIG. 13 is a perspective view illustrating the arrangement of the FFC earth sheet of the present embodiment, positioned in the second reading unit.

FIG. 13 illustrates a state where the FFC cover member 901, provided to the second reading unit 307, is removed from the second reading unit 307. With reference to FIG. 13, how the FFC earth sheet 3 is disposed in the second reading unit 307 will be described. FIG. 13 is a diagram illustrating the arrangement of the FFC earth sheet 3 disposed in the second reading unit 307. The second casing member 401, which constitutes the second reading unit 307, is provided with positioning projections 1302 that are one example of a projection. The positioning projections 1302 are positioned at positions that correspond to the positions of positioning hole portions 1305 of an FFC positioning sheet 1304, and to the positions of positioning hole portions 1303 of the FFC earth sheet 3. The FFC positioning sheet 1304 is stuck on the FFC 9 for positioning the FFC 9, and the positioning hole portions 1303 are one example of a hole portion. In the present embodiment, for preventing the FFC 9 and the FFC earth sheet 3 from becoming oblique in the pivot motion of the second reading unit 307, two positioning projections 1302 are disposed, separated from each other in the width direction. For the same reason, two positioning hole portions 1303 are disposed, separated from each other in the width direction; and two positioning hole portions 1305 are disposed, separated from each other in the width direction.

The FFC 9 is fixed to the second reading unit 307 by inserting (fitting) the positioning hole portions 1305 of the FFC positioning sheet 1304 in the positioning projections 1302. After the FFC 9 is fixed to the second reading unit 307, the positioning hole portions 1303 of the FFC earth sheet 3 are fit, from above, to the positioning projections 1302 for covering the upper side of the FFC 9 with the FFC earth sheet 3.

The FFC cover member 901 that serves as a fixing member is provided with an FFC fixing surface 1300. The FFC 9 and the FFC earth sheet 3 are nipped and fixed by the FFC fixing surface 1300 of the FFC cover member 901 and the top surface of the second casing member 401. In this configuration, the FFC 9 and the FFC earth sheet 3 are positioned and fixed in the second reading unit 307.

Second Document-Feeding-Reading Glass

Figure 14:
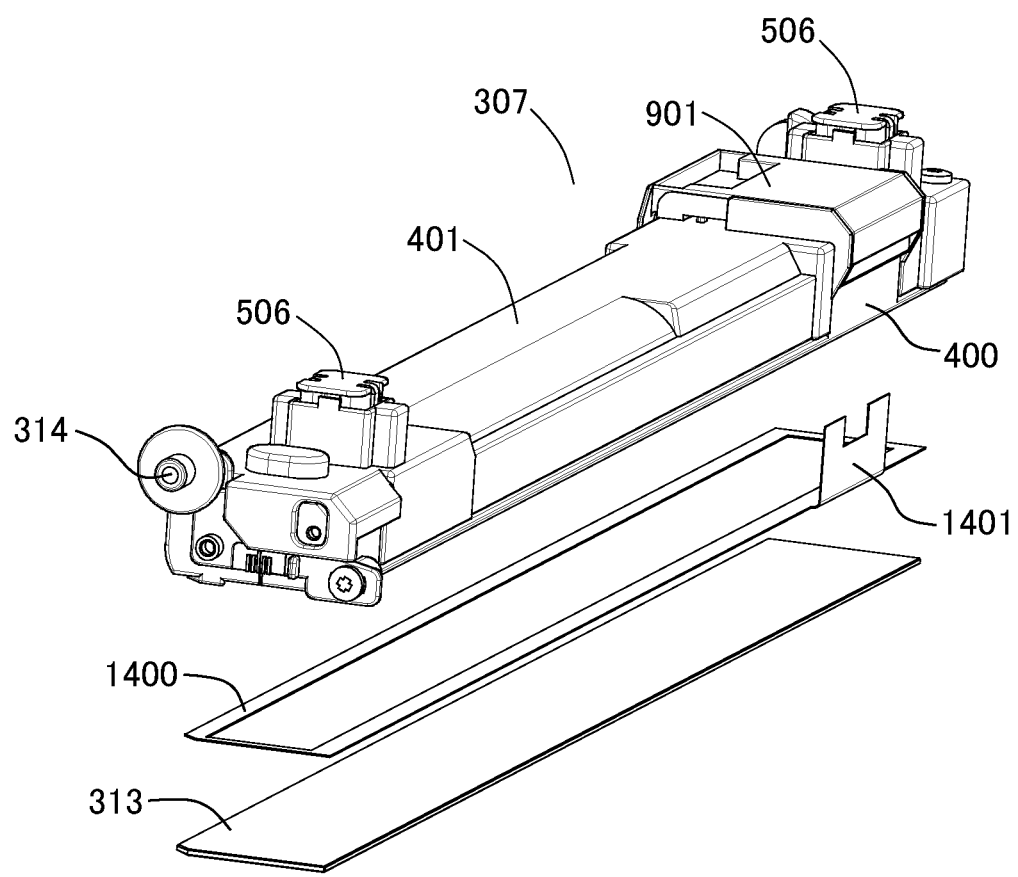
FIG. 14 is an exploded perspective view illustrating the second reading unit of the present embodiment.
Figure 15:
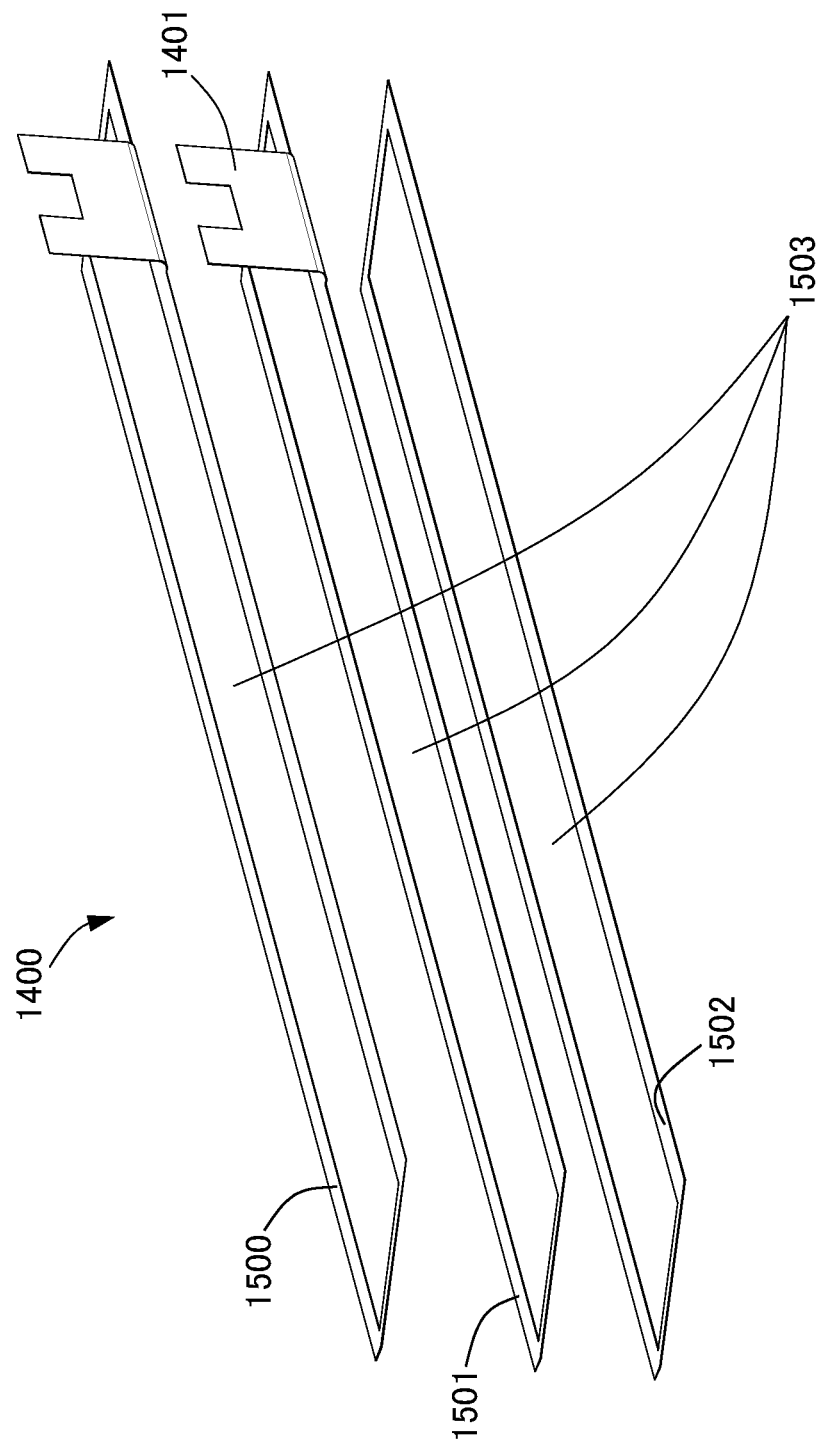
FIG. 15 is an exploded perspective view illustrating a glass earth sheet of the present embodiment.

Next, a configuration for fixing the second document-feeding-reading glass 313 disposed in the second reading unit 307 will be described with reference to FIGS. 14 to 17. FIGS. 14 to 17 are diagrams illustrating configurations of a glass earth sheet 1400 disposed on a portion of the second document-feeding-reading glass 313 of the present embodiment. As illustrated in FIGS. 14 and 15, the second document-feeding-reading glass 313 is stuck on the first casing member 400, which constitutes the second reading unit 307, via the glass earth sheet 1400 such that the glass earth sheet 1400 does not cover the opening portion 402 of the first casing member 400. Thus, the glass earth sheet 1400 has a shape that does not cover the opening portion 402.

The glass earth sheet 1400 is an adhesive conductive sheet member. The glass earth sheet 1400 may be a double-sided conductive tape, or may be a member in which an aluminum-foil tape and a double-sided tape are combined with each other. The aluminum-foil tape has an adhesive layer on one side. In another case, as illustrated in FIG. 15, the glass earth sheet 1400 may include a first sticking member 1500 that serves as a double-sided tape, a conductive sheet member 1501, and a second sticking member 1502 that serves as a double-sided tape. In this case, one side of the conductive sheet member 1501 may be stuck on the first sticking member 1500, and the second sticking member 1502 may be stuck on the other side of the conductive sheet member 1501.

The glass earth sheet 1400 includes an electrical-connection portion 1401 that serves as an electrical contact, for electrically grounding the glass earth sheet 1400, via the FFC cover member 901, as described below. That is, in the configuration illustrated in FIG. 15, the first sticking member 1500 is disposed for bonding the first casing member 400 and the conductive sheet member 1501. Thus, the first sticking member 1500 and the conductive sheet member 1501 have an identical shape, so that the electrical-connection portion 1401 of the conductive sheet member 1501, as well as the other portion of the conductive sheet member 1501, can be stuck on the first casing member 400. Unlike the first sticking member 1500, the second sticking member 1502 does not have a shape that corresponds to the shape of the electrical-connection portion 1401 of the conductive sheet member 1501. This is because the second sticking member 1502 has only to be used for sticking the second document-feeding-reading glass 313 on the conductive sheet member 1501.

In the present embodiment, the conductive sheet member 1501 is made of the above-described metal-foil composite film. The reason is that since the glass earth sheet 1400 has a shape 1503 that does not cover the opening portion 402, the glass earth sheet 1400 is required to have a certain level of hardness for sticking the glass earth sheet 1400 on the first casing member 400. If the glass earth sheet 1400 does not have the certain level of hardness, it will become difficult to stick the glass earth sheet 1400 on the first casing member 400. However, if it is ensured by using a jig or the like that the glass earth sheet 1400 can be stuck on the first casing member 400, a simple metal foil may be used.

Note that if the glass earth sheet 1400 is not disposed, a problem as described below may occur. That is, when a user performs work, such as the jam handling or the cleaning work for the second document-feeding-reading glass 313, in the vicinity of the second document-feeding-reading glass 313, static electricity may fly from fingertips of the user into the second reading unit 307 through a slight gap between the second document-feeding-reading glass 313 and the first casing member 400. Similarly, static electricity may fly from a document that is being conveyed, into the second reading unit 307 through a slight gap between the second document-feeding-reading glass 313 and the first casing member 400. If the static electricity enters the second reading unit 307 through the slight gap between the second document-feeding-reading glass 313 and the first casing member 400, the static electricity may flow to an electric component, such as an LED element disposed in the CIS 311; and may cause the failure of the electric component. Conventionally, the second document-feeding-reading glass 313 is stuck on the first casing member 400 via a simple double-sided tape that is not conductive. However, the double-sided tape is the same as an air layer, in terms of electricity. Thus, it is known that even if no gap seems to be formed, the static electricity passes through the double-sided tape, and may cause the failure of an electric component.

Figure 16:
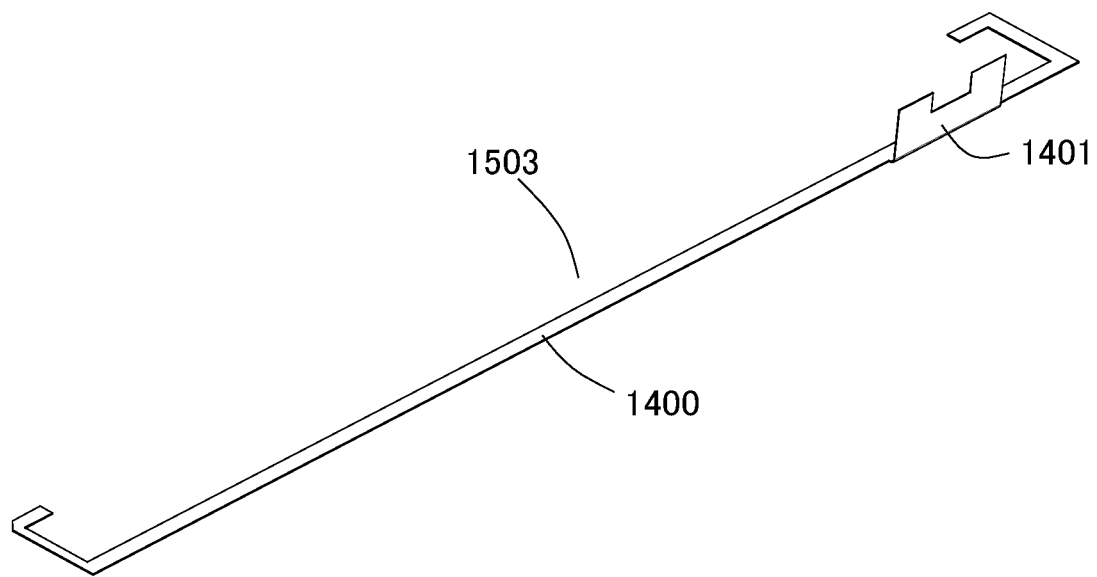
FIG. 16 is a perspective view illustrating a glass earth sheet of a modification of the present embodiment.
Figure 17:
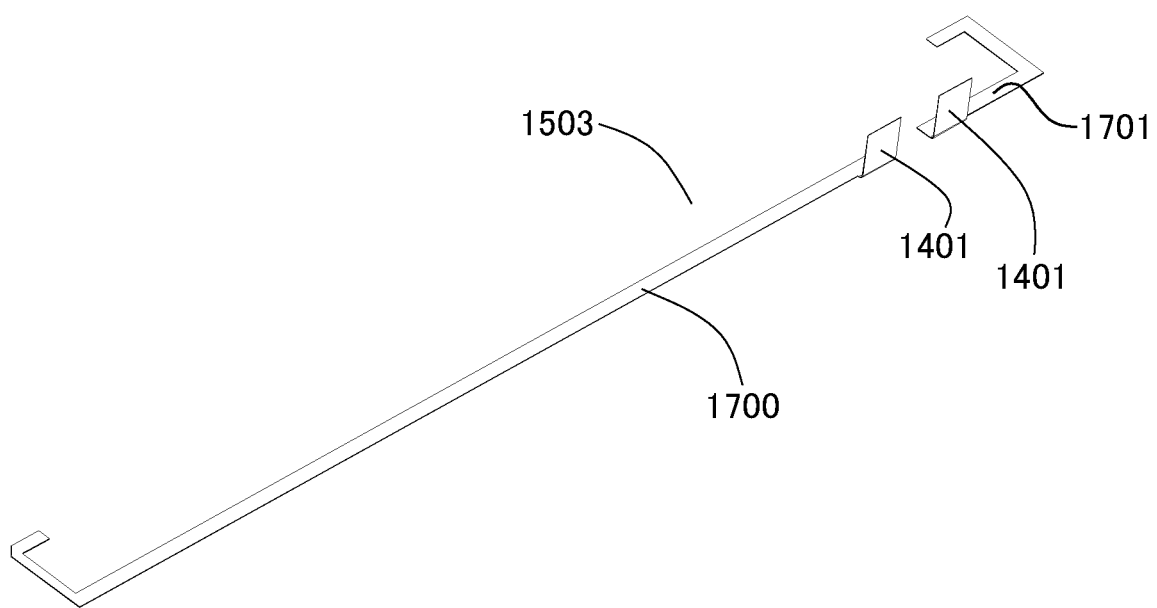
FIG. 17 is a perspective view illustrating a glass earth sheet of another modification of the present embodiment.

In the present embodiment, however, the second document-feeding-reading glass 313 is stuck on the first casing member 400 such that the whole circumference of the second document-feeding-reading glass 313 is stuck on the first casing member 400 via the conductive sheet member 1501. Thus, the risk caused by the static electricity can be avoided. Note that there is a case where it is not necessary to cover the whole circumference of the second document-feeding-reading glass 313 with the conductive sheet member 1501 because of the layout of electric elements. In this case, one portion of the glass earth sheet 1400 may be cut out, as illustrated in FIG. 16. Furthermore, the glass earth sheet 1400 may be constituted by a plurality of glass earth sheets, if necessary for the ease of assembly or the like. For example, as illustrated in FIG. 17, the glass earth sheet 1400 may be constituted by a first glass earth sheet 1700 and a second glass earth sheet 1701. However, in a case where any of the configurations as illustrated in FIGS. 16 and 17 is used, the area of the double-sided adhesive tape decreases. Thus, it is necessary to fully check whether the second document-feeding-reading glass 313 will peel off, and use a double-sided tape or the like in addition to the glass earth sheet, as appropriate.

Figure 18:
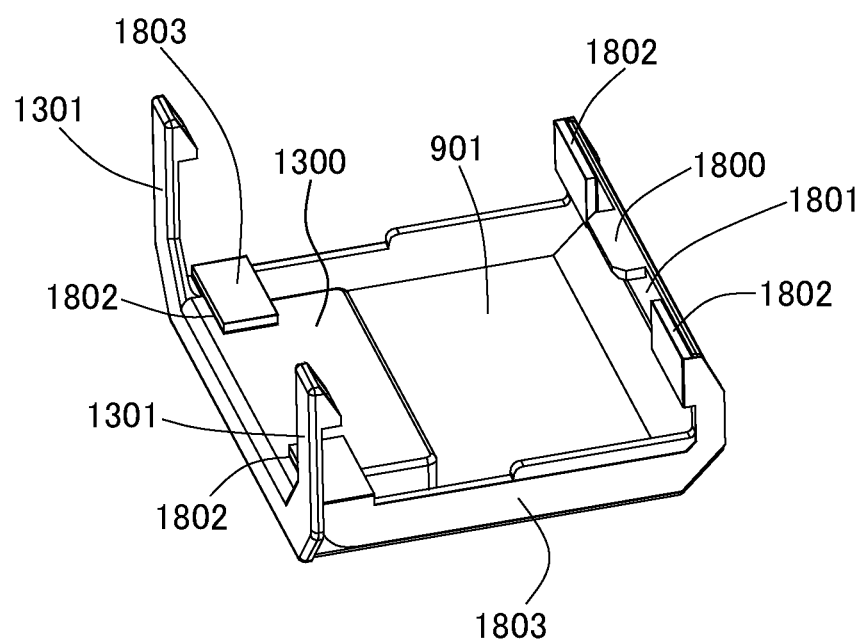
FIG. 18 is a perspective view illustrating an FFC cover member of the present embodiment.

Next, a configuration for grounding the electrical-connection portion 1401 of the glass earth sheet 1400 via the FFC cover member 901 will be described with reference to FIG. 18. FIG. 18 is a diagram illustrating a configuration of the FFC cover member 901 that covers the FFC earth sheet 3 of the present embodiment. As illustrated in FIG. 18, the FFC cover member 901 is provided with a surface 1801 that abuts against the first casing member 400, and the surface 1801 also abuts against the electrical-connection portion 1401 of the glass earth sheet 1400. On the abutment surface 1801, a catching portion 1800 is formed for catching a hole portion formed in the first casing member 400. The FFC cover member 901 includes the FFC fixing surface 1300 that fixes the FFC 9 and the FFC earth sheet 3. The FFC 9 and the FFC earth sheet 3 are nipped by the FFC fixing surface 1300 and the top surface of the second casing member 401, and thereby fixed.

The FFC cover member 901 is provided with snap-fit portions 1301. The snap-fit portions 1301 and the catching portion 1800 can be detachably attached to the second reading unit 307. In addition, four sponges 1802 that serve as elastic members are provided. Two of the sponges 1802 are disposed on the abutment surface 1801 of the FFC cover member 901, and the other two of the sponges 1802 are disposed on the FFC fixing surface 1300 of the FFC cover member 901. In addition, two conductive sheet members 1803 are provided. One of the conductive sheet members 1803 is disposed so as to connect the abutment surface 1801 and one of the sponges 1802 stuck on the FFC fixing surface 1300, and the other of the conductive sheet members 1803 is disposed so as to connect the abutment surface 1801 and the other of the sponges 1802 stuck on the FFC fixing surface 1300. The conductive sheet members 1803 are not required to have particular hardness and durability against bending. Thus, in the present embodiment, each of the conductive sheet members 1803 is an aluminum tape in which an adhesive layer is formed on an aluminum foil.

In this configuration, when the FFC cover member 901 is assembled to the second reading unit 307, one end portion of each of the conductive sheet members 1803 is brought into pressure contact with the electrical-connection portion 1401 of the glass earth sheet 1400 by the elastic force of a corresponding sponge 1802. In addition, the other end portion of each of the conductive sheet members 1803 is brought into pressure contact with the FFC earth sheet 3. As a result, all of the glass earth sheet 1400, the FFC earth sheet 3, and the earth wire 1101 are electrically connected with each other, and are electrically grounded. This configuration can make the number of components smaller than that in a configuration in which the glass earth sheet 1400 and the FFC earth sheet 3 are separately grounded.

Self-Supporting Operation

Figure 19:
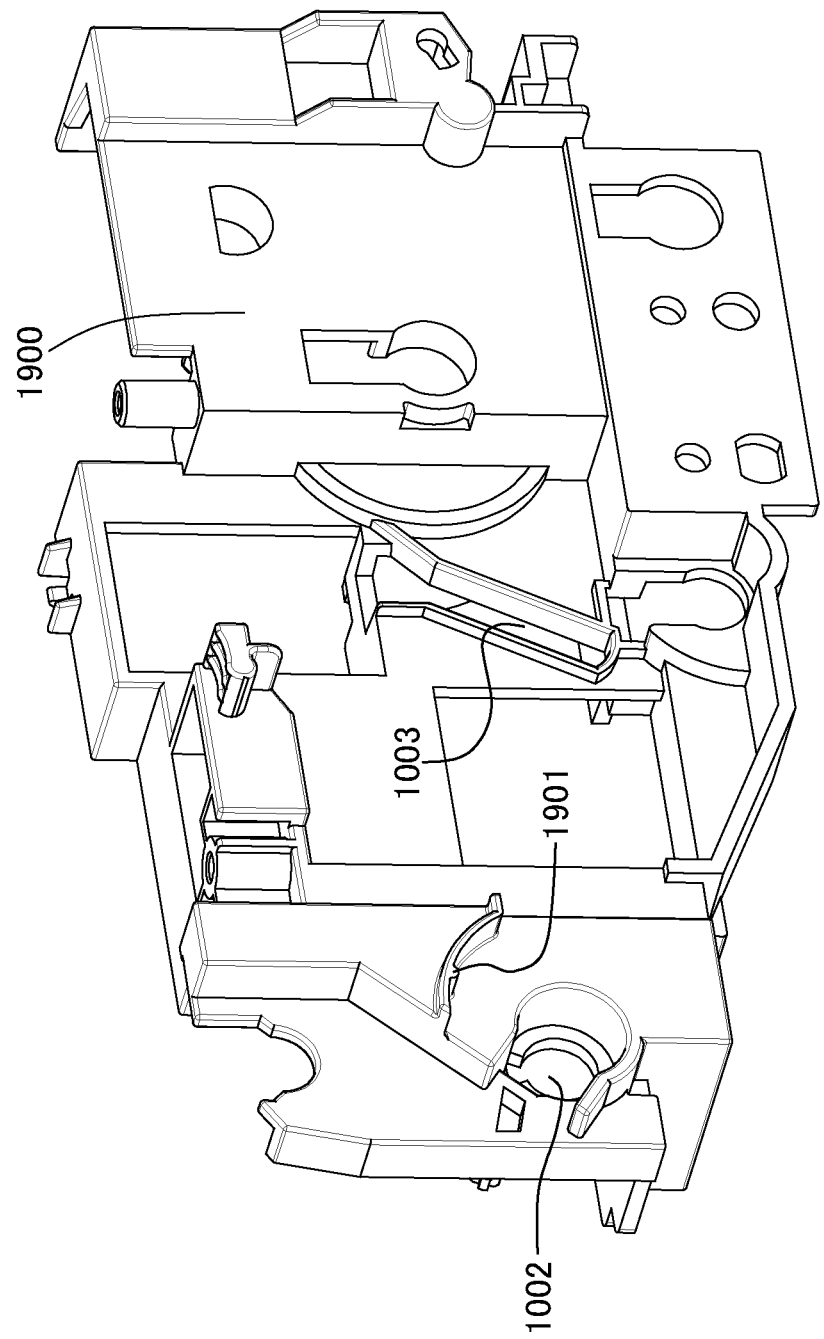
FIG. 19 is a perspective view illustrating a front side-plate of the present embodiment.
Figure 20:
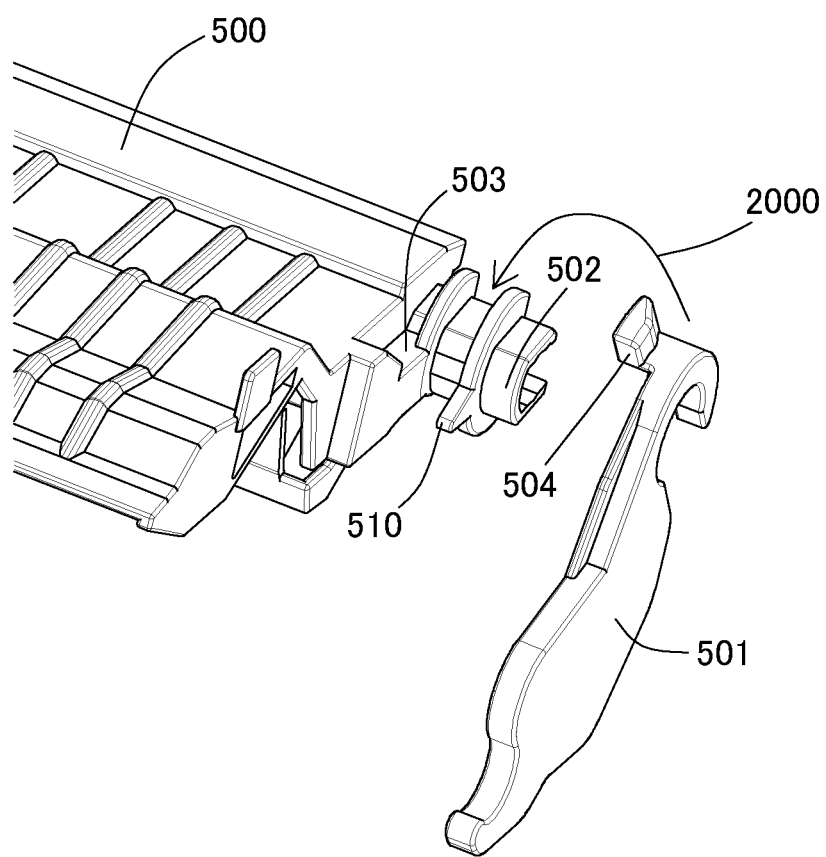
FIG. 20 is an exploded perspective view illustrating a separation guide member and a cam member of the present embodiment.
Figure 21:
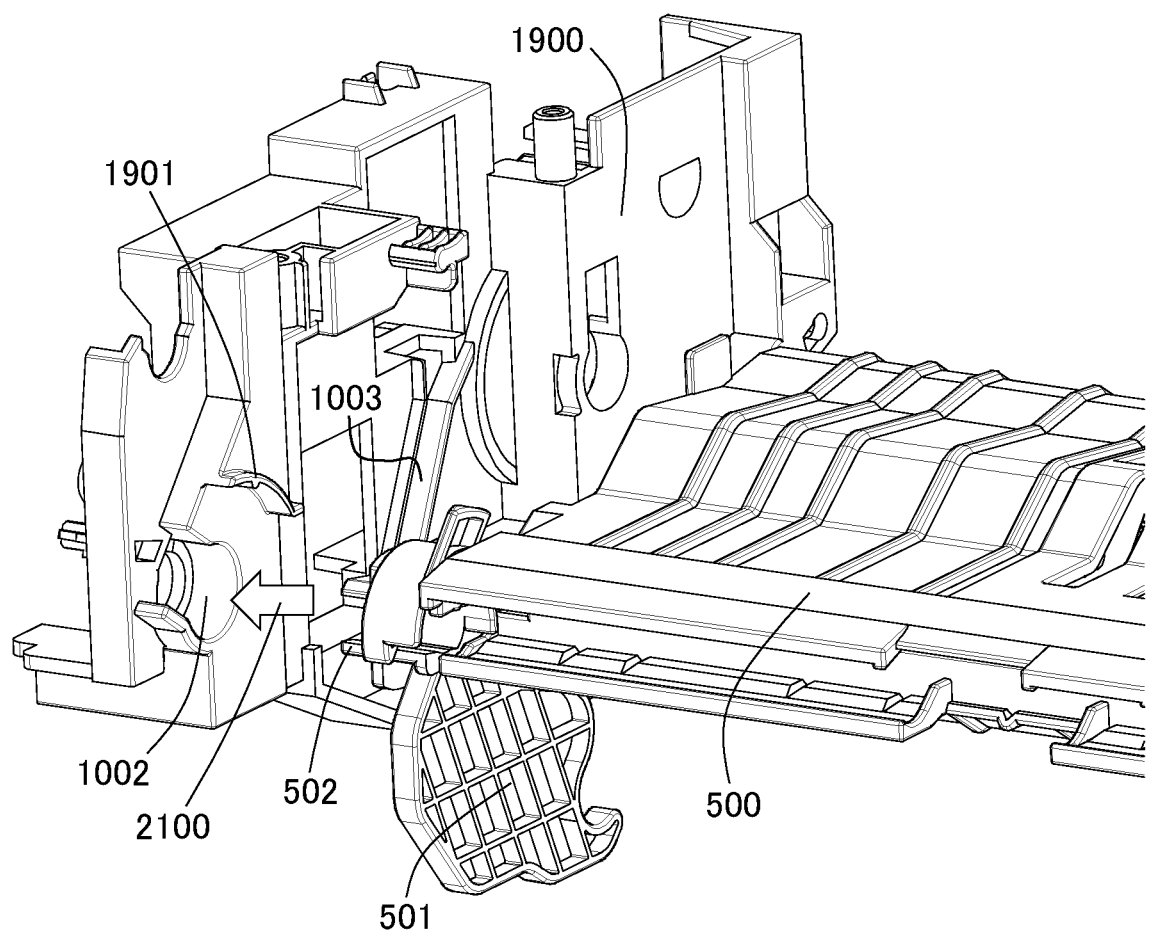
FIG. 21 is an exploded perspective view illustrating the front side-plate and the separation guide member of the present embodiment.
Figure 22:
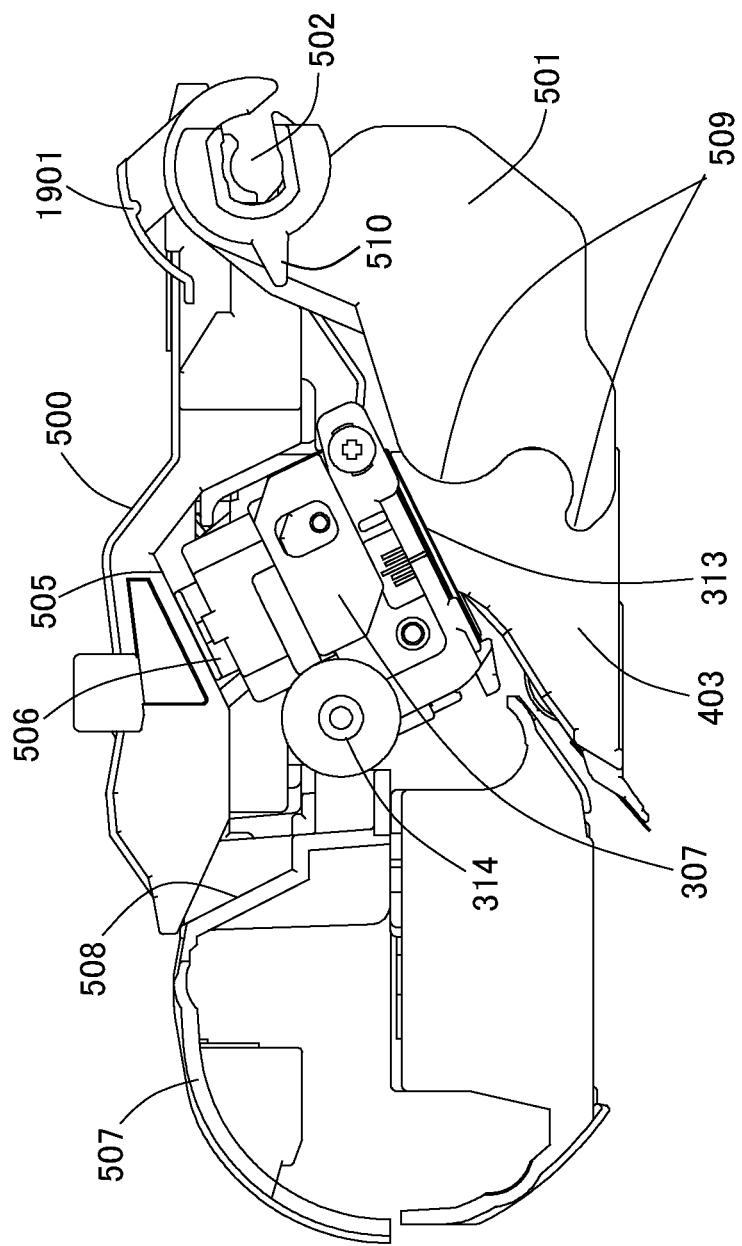
FIG. 22 is a front view illustrating a pivot regulation portion and a first projection portion of the present embodiment that are in a closed state.
Figure 23:
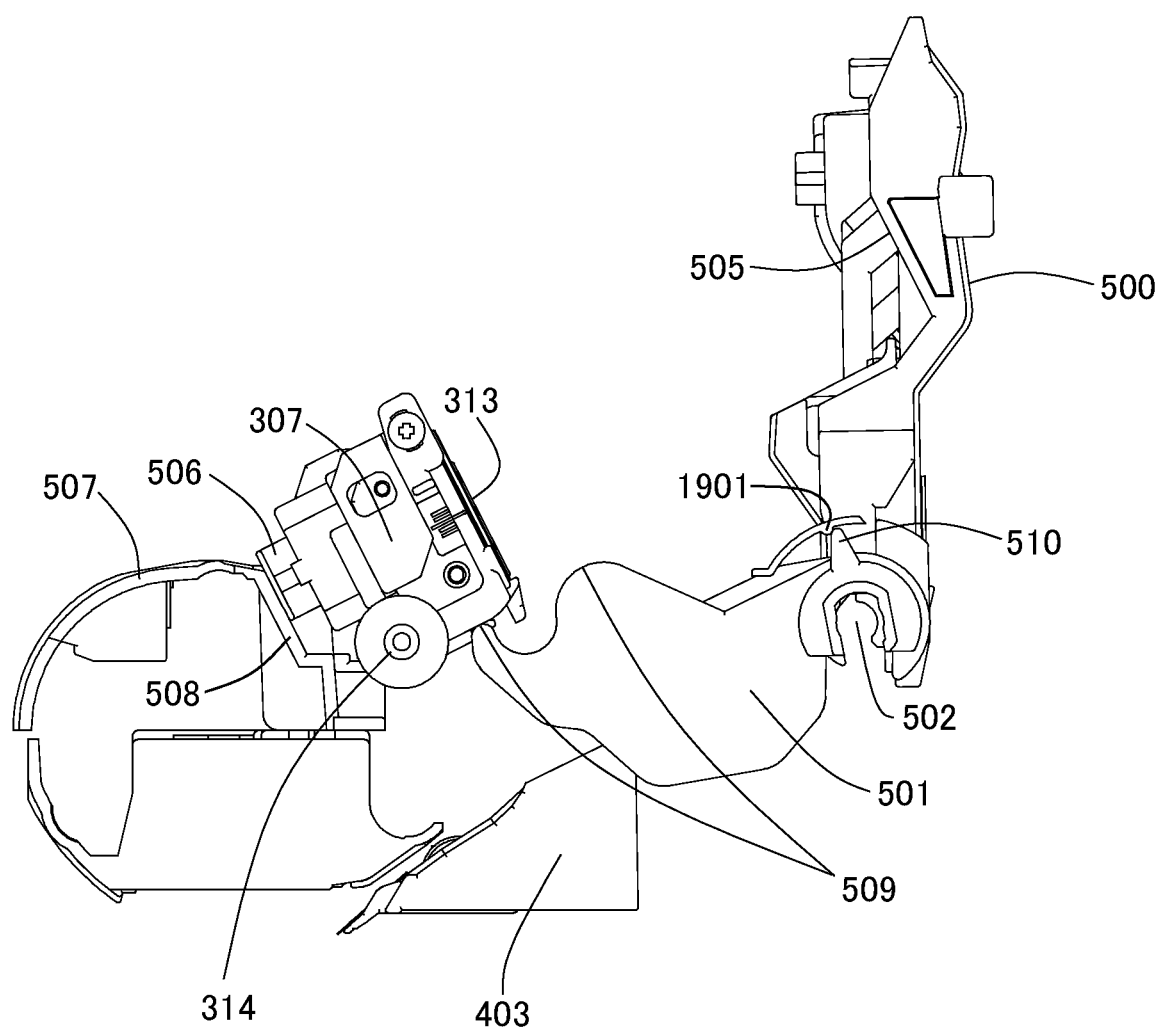
FIG. 23 is a front view illustrating the pivot regulation portion and the first projection portion of the present embodiment that are located in open positions.
Figure 24:
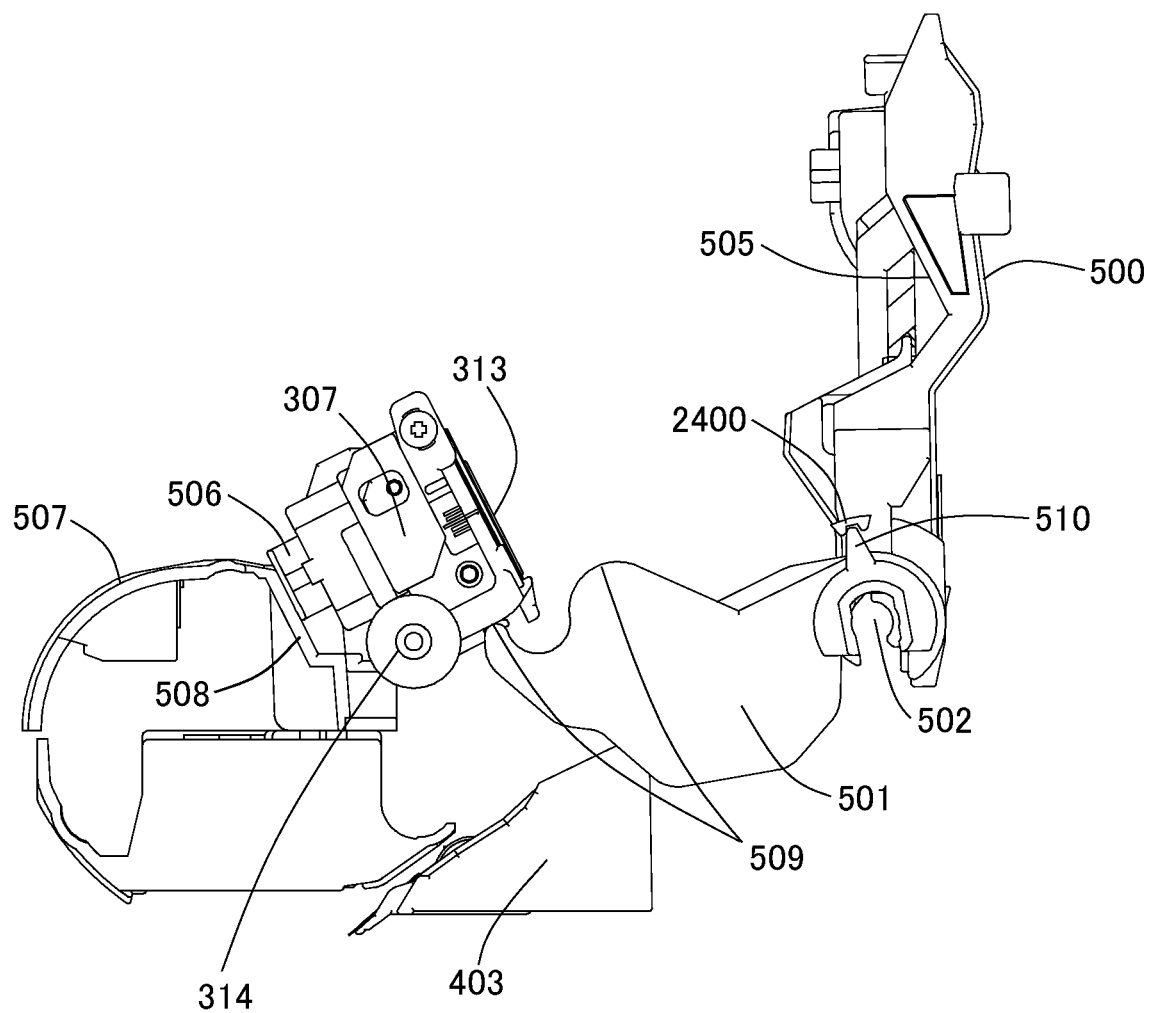
FIG. 24 is a front view illustrating a pivot regulation portion of a modification of the present embodiment.

Next, a self-supporting state of the separation guide member 500 and the second reading unit 307 will be described with reference to FIGS. 19 to 24. The self-supporting state is produced when the separation guide member 500 is pivoted until the separation guide member 500 enters the open state illustrated in FIG. 23 or 24. In the self-supporting state, the separation guide member 500 and the second reading unit 307 are regulated from pivoting. FIG. 19 is a diagram illustrating the second projection portion 1901 formed on the front side-plate 1900 of the present embodiment. FIG. 20 is a diagram illustrating a relationship between the separation guide member 500 and the cam member 501 of the present embodiment. FIG. 21 is a diagram illustrating a relationship between the separation guide member 500 and the front side-plate 1900 of the present embodiment. FIGS. 22 to 24 are diagrams each illustrating a relationship between the second projection portion 1901 and the first projection portion 510 of the present embodiment.

As illustrated in FIG. 19, the front side-plate 1900, which constitutes the main-body unit 102a of the ADF 102, is provided with a fitting groove portion 1003 that corresponds to a front pivot shaft 314 disposed in the second reading unit 307. The front pivot shaft 314 fits in the fitting groove portion 1003. In addition, the front side-plate 1900 is provided with a fitting hole portion 1002 that corresponds to a front pivot shaft 502 disposed in the separation guide member 500. The front pivot shaft 502 fits in the fitting hole portion 1002. In addition, the front side-plate 1900 is provided with the second projection portion 1901 that is formed in the vicinity of the fitting hole portion 1002, and that serves as a pivot regulation portion. The second projection portion 1901 abuts against the first projection portion 510 of the separation guide member 500, so that the second projection portion 1901 keeps the pivoted posture of the separation guide member 500 and prevents the separation guide member 500 from returning to its original posture.

As illustrated in FIG. 20, the cam member 501 is attached to the pivot shaft 502 of the separation guide member 500 on the front side-plate 1900 side. The cam member 501 is engaged with the pivot shaft 502 so as to be able to pivot around the pivot shaft 502. If the separation guide member 500 pivots by a predetermined angle or more, the first contact portion 503 formed in the separation guide member 500 and the second contact portion 504 formed in the cam member 501 abut against each other. As a result, the separation guide member 500 and the cam member 501 pivot in synchronization with each other. In the vicinity of the pivot shaft 502 of the separation guide member 500, the first projection portion 510 is formed.

As illustrated in FIGS. 21 to 23, the front side-plate 1900 and the separation guide member 500 are assembled to each other such that the pivot shaft 502 of the separation guide member 500 fits in the fitting hole portion 1002 of the front side-plate 1900. If the first projection portion 510 of the separation guide member 500 climbs over the second projection portion 1901 formed on the front side-plate 1900, the separation guide member 500 is prevented from returning to its original posture even if a user releases a hand from the separation guide member 500, so that the pivoted posture of the separation guide member 500 can be kept.

In addition, since the first contact portion 503 of the separation guide member 500 and the second contact portion 504 of the cam member 501 are in contact with each other, the pivoted posture of the cam member 501 is also kept. Furthermore, since the cam portion 509 of the cam member 501 supports the second reading unit 307, the pivoted posture of the second reading unit 307 is also kept. Thus, a user can perform the cleaning work for the second document-feeding-reading glass 313, which is disposed on the second reading unit 307, and the protective glass 404, which protects the white sheet 405, and the jam handling in a state where the hand of the user is separated from the separation guide member 500. Note that although the second projection portion 1901 is used, in the present embodiment, as the pivot regulation portion, the pivot regulation portion is not limited to this. For example, as illustrated in FIG. 24, the pivot regulation portion that corresponds to the first projection portion 510 may be a recess portion 2400, which corresponds to the first projection portion 510. Note that on the back side of the main-body unit 102a, a back side-plate (not illustrated) is disposed, and in the back side-plate, a fitting groove portion and a fitting hole portion that are the same as those of the front side-plate 1900 are formed. The back side-plate supports the second reading unit 307 and the separation guide member 500, like the front side-plate 1900 does.

As described above, the image forming apparatus 1 of the present embodiment includes the FFC earth sheet 3 that covers the exposed portion 90 of the FFC 9. Thus, even if the static electricity flies from fingertips of a user toward the exposed portion 90 of the FFC 9 when the user performs work in the vicinity of the FFC 9, the static electricity is discharged from the FFC 9. As a result, the possibility that the static electricity from fingertips of a user causes the failure of a component connected to the FFC 9 can be reduced.

In addition, in the image forming apparatus 1 of the present embodiment, the FFC earth sheet 3 is a film in which the metal layer and the polyester layer are laminated on each other. Thus, the FFC earth sheet 3 has the durability against repeated bending operations, and hardly breaks easily. Furthermore, since the polyester layer is disposed closer to the FFC 9 than the metal layer is, the FFC earth sheet 3 can efficiently discharge the static electricity.

Note that in the FFC earth sheet 3 of the above-described embodiment, the polyester layer is disposed closer to the FFC 9 than the metal layer is. However, the present disclosure is not limited to this. For example, the metal layer may be disposed closer to the FFC 9 than the polyester layer is. Even in this case, since the static electricity is conducted by the metal layer, the static electricity can be discharged. Note that the FFC earth sheet 3 may be a film in which an aluminum layer, a polyester layer, and another aluminum layer are formed in this order. In this case, the same effect can be produced, regardless of which of the front surface and the back surface of the FFC earth sheet 3 is disposed closer to the FFC 9.

In the present embodiment, the FFC earth sheet 3 is disposed on a surface of the FFC 9 on the upper conveyance path 11a side, that is, on a side on which the FFC 9 is exposed to the outside. However, the present disclosure is not limited to this. For example, the FFC earth sheet 3 may be disposed on a surface of the FFC 9 on a side opposite to the upper conveyance path 11a, that is, on a side on which the FFC 9 is not exposed to the outside. In this case, if the edge portion of the FFC earth sheet 3 is extended, and thus the width of the FFC earth sheet 3 is made larger than that of the FFC 9, the static electricity will flow more in the FFC earth sheet 3 than in the FFC 9. In another case, the FFC earth sheet 3 whose width is smaller than the width of the FFC 9 may be disposed on a surface of the FFC 9 on a side opposite to the upper conveyance path 11a. Even in this case, the effect of discharging static electricity can be produced more than in a case where the FFC earth sheet 3 is not disposed.

In the present embodiment, the second reading unit 307 and the exposed portion 90 are exposed to the outside when the separation guide member 500 is opened. However, the present disclosure is not limited to this. For example, in a configuration in which the separation guide member 500 is not disposed, the second reading unit 307 and the exposed portion 90 may be exposed to the outside when the outer cover 12 is opened. In another case, the exposed portion 90 may be exposed to the outside when the outer cover 12 is opened and the second reading unit 307 is opened by pivoting the second reading unit 307. In this case, the exposed portion is exposed closer to the lower conveyance path 11b than the FFC 9 is. In another case, the second reading unit 307 may be fixed to the separation guide member 500, and pivot together with the separation guide member 500.

The present invention can reduce the possibility that the static electricity, which flies from fingertips of a worker during work performed in the vicinity of the FFC, causes the failure of an electric component connected to the FFC.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-147716, filed Sep. 16, 2022 which is hereby incorporated by reference herein in its entirety.

What is claimed is:

1. An image reading apparatus comprising:
   a main body;
   a cover configured to pivot with respect to the main body and move between a first closed position and a first open position, the first closed position being a position in which the cover is configured to form a first area of a conveyance path in which a sheet is conveyed, the first open position being a position in which the cover is configured to open the first area;
   a reading unit configured to pivot with respect to the main body and read an image of a sheet conveyed in the conveyance path;
   a cable configured to transmit an image signal from the reading unit, the cable including an exposed portion located between the main body and the reading unit and exposed to an outside of the main body in a state where the cover is located in the first open position; and
   a shield member electrically grounded and disposed to cover the exposed portion of the cable.

2. The image reading apparatus according to claim 1, wherein the shield member is a film including a metal layer and a polyester layer laminated on each other.

3. The image reading apparatus according to claim 2, wherein the film is disposed such that the polyester layer is closer to the cable than the metal layer is.

4. The image reading apparatus according to claim 1, further comprising:
   a pivot guide member configured to pivot with respect to the main body in the state where the cover is located in the first open position and move between a second closed position and a second open position, the second closed position being a position in which the pivot guide member is configured to cover the reading unit and the exposed portion, the second open position being a position in which the pivot guide member is configured to expose the reading unit and the exposed portion,
   wherein in a state where the cover is located in the first closed position, the cover and the pivot guide member located in the second closed position are configured to form the first area of the conveyance path.

5. The image reading apparatus according to claim 4, further comprising:
   an interlocking member configured to pivot the reading unit by moving with pivot of the pivot guide member.

6. The image reading apparatus according to claim 4, wherein the main body includes a conveyance guide member disposed downstream of the pivot guide member in a sheet conveyance direction and configured to guide a sheet, and
   wherein the exposed portion is a portion of the cable exposed in a clearance between the reading unit and the conveyance guide member in the state where the cover is located in the first open position and in a state where the pivot guide member is located in the second open position.

7. The image reading apparatus according to claim 1,
   wherein the main body includes a reading-guide member disposed opposite to the cover with respect to the reading unit, and configured to form a second area of the conveyance path between the reading-guide member and the reading unit downstream of the first area of the conveyance path in a sheet conveyance direction, and
   wherein the reading unit is configured to read an image of a sheet conveyed in the second area of the conveyance path.

8. The image reading apparatus according to claim 1, further comprising:
   a fixing member configured to fix the cable and the shield member to the reading unit.

9. The image reading apparatus according to claim 1,
   wherein the reading unit includes a reading sensor configured to read an image of a sheet and a casing member configured to accommodate the reading sensor, and
   wherein the shield member is configured to be positioned by a hole portion formed in the shield member fitting to a projection formed on the casing member.

10. An image forming apparatus comprising:
    the image reading apparatus according to claim 1; and
    an image forming portion configured to form an image that has been read by the image reading apparatus on a sheet.

* * * * *